US011209379B2

(12) United States Patent
Hutton et al.

(10) Patent No.: US 11,209,379 B2
(45) Date of Patent: Dec. 28, 2021

(54) BORON DOPED DIAMOND BASED ELECTROCHEMICAL SENSOR HEADS

(71) Applicant: Element Six Technologies Limited, Oxfordshire (GB)

(72) Inventors: Laura Anne Hutton, Oxfordshire (GB); Maxim Bruckshaw Joseph, Warwickshire (GB); Roy Edward Patrick Meyler, Warwickshire (GB); Julie Victoria Macpherson, Warwickshire (GB); Timothy Peter Mollart, Oxfordshire (GB); Zoe Ayers, Warwickshire (GB)

(73) Assignee: Element Six Technologies Limited, Oxfordshire (GB)

( * ) Notice: Subject to any disclaimer, the term of this patent is extended or adjusted under 35 U.S.C. 154(b) by 530 days.

(21) Appl. No.: 15/527,550

(22) PCT Filed: Nov. 20, 2015

(86) PCT No.: PCT/EP2015/077246
§ 371 (c)(1),
(2) Date: May 17, 2017

(87) PCT Pub. No.: WO2016/083263
PCT Pub. Date: Jun. 2, 2016

(65) Prior Publication Data
US 2017/0322172 A1    Nov. 9, 2017

(30) Foreign Application Priority Data

Nov. 25, 2014  (GB) ..................................... 1420912
May 12, 2015  (GB) ..................................... 1508073

(51) Int. Cl.
*G01N 27/30*    (2006.01)

(52) U.S. Cl.
CPC ......... *G01N 27/302* (2013.01); *G01N 27/308* (2013.01)

(58) Field of Classification Search
CPC . G01N 27/302; G01N 27/308; G01N 27/4075
See application file for complete search history.

(56) References Cited

U.S. PATENT DOCUMENTS 4,629,373 A * 12/1986 Hall ...................... B23B 27/146
                                                        175/434
2005/0029095 A1 * 2/2005 Hall ...................... G01N 27/308
                                                        204/400

(Continued)

FOREIGN PATENT DOCUMENTS

GB    2489106 A    9/2012
GB    2520753 A    3/2015

(Continued)

OTHER PUBLICATIONS

Foord et al. (JS Foord, W Hao, S Hurst, Studies of the chemical functionalization of diamond electrodes, Diamond and related materials 16 (2007) 877-880). (Year: 2007).*

(Continued)

*Primary Examiner* — Joshua L Allen
(74) *Attorney, Agent, or Firm* — Armstrong Teasdale LLP

(57) ABSTRACT

An electrochemical sensor comprising: a boron doped diamond electrode formed of boron doped diamond material; an array of non-diamond carbon sites disposed on a sensing surface of the boron doped diamond electrode; electrochemically active surface groups bonded to the non-diamond carbon sites for generating a redox peak associated with a target species which reacts with the electrochemically active surface groups bonded to the non-diamond carbon sites when a solution containing the target species is disposed in contact with the sensing surface in use; an electrical controller configured to scan the boron doped diamond (Continued)

electrode over a potential range to generate said redox peak; and a processor configured to give an electrochemical reading based on one or both of a position and an intensity of said redox peak.

8 Claims, 28 Drawing Sheets

(56) References Cited

U.S. PATENT DOCUMENTS

| | | | | |
|---|---|---|---|---|
| 2009/0152109 | A1* | 6/2009 | Whitehead | G01N 27/308 204/400 |
| 2010/0006450 | A1* | 1/2010 | Whitehead | C25B 1/13 205/742 |
| 2011/0308942 | A1* | 12/2011 | Liu | G01N 27/27 204/400 |
| 2012/0037505 | A1* | 2/2012 | Pickles | G01N 27/308 204/400 |
| 2013/0105312 | A1* | 5/2013 | Oliver | G01N 27/308 204/400 |
| 2013/0313128 | A1* | 11/2013 | Fielden | G01N 27/308 205/780 |
| 2013/0327640 | A1* | 12/2013 | Mollart | G01N 27/308 204/294 |
| 2015/0060267 | A1* | 3/2015 | Mollart | C02F 1/46109 204/294 |
| 2015/0102266 | A1* | 4/2015 | Bitziou | G01N 27/308 252/502 |
| 2016/0282293 | A1* | 9/2016 | Stacey | G01N 27/413 |

FOREIGN PATENT DOCUMENTS

| | | | | |
|---|---|---|---|---|
| WO | 2005012894 | A1 | 2/2005 | |
| WO | 2010029277 | A1 | 3/2010 | |
| WO | 2012156203 | A1 | 11/2012 | |
| WO | WO-2012156203 | A1 * | 11/2012 | G01N 27/48 |
| WO | 2013135783 | A1 | 9/2013 | |
| WO | 2015049344 | A1 | 4/2015 | |

OTHER PUBLICATIONS

Murata et al. (M Murata, TA Ivandini, M Shibata, S Nomura, A Fujishima, Y Einaga, Electrochemical detection of free chlorine at highly boron-doped diamond electrodes, Journal of Electroanalytical Chemistry 612 (2008) 29-36). (Year: 2008).*

Kahlert (H Kahlert, Functionalized carbon electrodes for pH determination, J. Solid State Electrochem. 12 (2008) 1255-1266) (Year: 2008).*

Sarapuu et al. (A Sarapuu, K Helstein, DJ Schiffrin, K Tammeveski, Kinetics of oxygen reduction on quinone-modified HOPG and BDD electrodes in alkaline solution, Electrochemical and Solid-State Letters 8 (2005) E30-E33) (Year: 2005).*

Feeney et al. (R Feeney, S Kounaves, Microfabricated ultramicroelectrode arrays: developments, advances, and applications in environmental analysis, Electroanalysis 12(9) (2000) 677-684) (Year: 2000).*

Sljukic et al. (B Sljukic, CE Banks, RG Compton, An overview of the electrochemical reduction of oxygen at carbon-based modified electrodes, J. Iranian Chemical Society 2(1) (2005) 1-25) (Year: 2005).*

(JHT Luong, KB Male, JD Glennon, Boron-doped diamond electrode; synthesis, characterization, functionalization and analytical applications, Analyst 134 (2009) 1965-1979) (Year: 2009).*

Ayres, Z. J. et al., "Controlled sp2 Functionalization of Boron Doped Diamond as a Route for the Fabrication of Robust and Nernstian pH Electrodes," Analytical Chemistry, 88(1): 974-980 (2015).

Eifert, A. et al., "Focuse Ion Bean (FIB)—induced changes in the Electrochemical Behavior of (BDD) Electrodes," Electrochimica Acta, 130: 418-425, (2014).

Jin, H. et al., "Determination of Butylated Hydroxyanisole Based on BDD Electrode Modified with Au/MWCNTs," Journal of the Chinese Cereals and Oils Association, 28(8): 114-117 (Aug. 2013), Database Ascension No. E20134116842635.

Joseph, M. et al., "Fabrication Route for the Production of Coplanar, Diamond Insulated, Boron Doped Diamond Macro- and Microelectrodes of any Geometry," Analytical Chemistry, 86(11): 5238-5244 (2014).

Lounasvuori, M. M. et al., "Electrochemical Characterisation of Graphene Nanoflakes with Functionalised Edges," Faraday Discussions, 172: 293-310 (2014).

Lu, M. et al., "Voltammetric pH Sensing Using Carbon Electrodes: Glassy Carbon Behaves Similarly to EPPG," Analyst, 139(18): 4599-4600 (2014).

Lu, M. et al., "Voltammetric pH Sensor based on an Edge Plane Pyrolytic Graphite Electrode," Analyst, 139(10): 2397-2403 (2014).

Luong, J.H.T. et al., "Boron-doped diamond electrode: synthesis, characterization, functionalization and analytical applications," Analyst, 134(10): 1965-1979 (2009).

Mahe, E. et al., "Electrochemical Reactivity at graphitic microdomains on polycrystalline boron doped diamond thin-films electrodes," Electrochima Acta, 50(11): 2263-2277 (2005).

Murata, M. et al., "Electrochemical detection of free chlorine at highly boron-doped diamond electrodes", Journal of Electroanalytical Chemistry, 612(1): 29-36 (2008).

Read, T.L. et al., "In Situ Control of Local pH Using a Boron Doped Diamond Ring Disk Electrode: Optimizing Heavy Metal (Mercury) Detection", Analytical Chemistry, 86(1): 367-371 (2014).

Silva, E.L. et al., "Novel Diamond Microelectrode for pH Sensing," Electrochemistry Communications, 40: 31-34 (2014).

Song, M-J. et al., "Pt-polyaniline nanocomposite on boron-doped diamond electrode for amperometic biosensor with low detection limit," Microchimica Acta, 171(3-4): 249-255 (2010).

Zhou, Y. et al., "The application of boron-doped diamond electrodes in amperometric biosensors", Talanta, 79(5): 1189-1196 (2009).

International Search Report and Written Opinion issued for PCT/EP2015/077246, dated Feb. 17, 2016 (17 pages).

* cited by examiner

B = 2.5 mA/cm² (Background)
S = 12.5 mA/cm² (Signal)
S/B = 5 for planar BDD with NDC B = 3.5 mA/cm²
S = 29 mA/cm²
S/B = 8.3 for laser structured BDD B = 13 mA/cm²
S = 11 mA/cm²
S/B = 0.8 for glassy carbon B = 15 mA/cm²
S = 30 mA/cm²
S/B = 30/15 = 2 for nanodiamond B = 16.5 mA/cm²
S = 29.5 mA/cm²
S/B = 1.8 for graphic paste

BORON DOPED DIAMOND BASED ELECTROCHEMICAL SENSOR HEADS

CROSS-REFERENCE TO RELATED APPLICATIONS

This application is the § 371 national stage of International Application No. PCT/EP2015/077246, filed Nov. 20, 2015, which claims priority to Great Britain Application No. 1420912.6, filed Nov. 25, 2014, and Great Britain Application No. 1508073.2, filed May 12, 2015.

FIELD OF INVENTION

Certain embodiments of the present invention relate to diamond based electrochemical sensor heads, methods of fabricating diamond based electrochemical sensor heads, sensors comprising diamond based electrochemical sensor heads, and methods of using such sensors.

BACKGROUND OF INVENTION

It has already been proposed in the prior art to provide a diamond based sensor for measuring the electrochemical properties of a solution. Diamond can be doped with boron to form semi-conductive or metal like conductive material for use as an electrode. Electrically conductive diamond is also hard, inert, and has a very wide potential window making it a very desirable material for use as a sensing electrode for an electrochemical cell, particularly in harsh chemical, physical, and/or thermal environments which would degrade standard metal based electrochemical sensors.

WO2013/135783 disclosed optimized boron doped diamond (BDD) materials for electrochemical sensing applications which have a high boron content and a low sp2 carbon content which can be used to form boron doped diamond electrodes which have a wide solvent window, a high degree of reversibility, and a low capacitance. In this document it is described that introducing high concentrations of boron into the diamond lattice during synthesis in order to reach the desired levels of electrical conductivity also results in a significant amount of sp2 carbon (also referred to as Non-Diamond Carbon or NDC) being introduced into the diamond material. It is described that high sp2 carbon content or non-diamond carbon results in background currents which can interfere with electrochemical sensing of target species, particularly at very low target species concentration levels. Synthesis methods and product materials are described to provide optimized boron doped diamond materials for electrochemical sensing applications which have a high boron content and a low sp2 carbon content. Such a material has a wide solvent window, low background currents, high signal resolution, low capacitance, and a high degree of reversibility towards outer sphere redox species.

While such a material has been shown to be excellent for sensing certain target species as well as measuring parameters such as solution conductivity, the optimized diamond material is electrochemically inert and incapable of generating a signal for certain target species in solution. In this regard, it is known that the surface of a boron doped diamond electrode may be functionalized to sense certain species in a solution adjacent the electrode. For example, a boron doped diamond electrode can be functionalized with metal nanoparticles as described in WO2010/029277 to sense target species such as oxygen. Boron doped diamond electrodes with significant concentrations of non-diamond carbon at a sensing surface thereof can also be used to sense target species such as free chlorine which does not generate a signal using a boron doped diamond material which is optimized to have substantially no non-diamond carbon at the sensing surface. See, for example, Murata et al., "Electrochemical detection of free chlorine at highly boron-doped diamond electrodes", Journal of Electroanalytical Chemistry, Volume 612, Issue 1, 1 Jan. 2008, Pages 29-36.

Boron-doped diamond electrodes which are functionalized with species such as metal nanoparticles or non-diamond carbon can thus be used to sense target species which cannot be detected and measured using unfunctionalized boron doped diamond electrodes. However, the present inventors have noted a number of problems with such functionalized boron doped diamond electrodes:

(1) While functionalizing a boron doped diamond electrode with species such as metal nanoparticles can allow certain target species to be detected and measured, the functionalized surface is not robust and stable in use. For example, the electrode is required to be cleaned between measurements and this can result in the functionalizing material being removed thus degrading the performance of the electrode. Furthermore, if oxidising potentials are applied then this can cause dissolution of metal nanoparticles which over time will cause the functionalization to disappear from the electrode surface.

(2) While functionalizing a boron doped diamond electrode can allow a signal to be generated for a target species which is not otherwise generated using unfunctionalized boron doped diamond electrodes, the background signal can also increase thus reducing signal-to-noise and preventing reliable detection of target species at very low concentrations.

(3) While functionalizing a boron doped diamond electrode can allow a signal to be generated for a target species which is not otherwise generated using unfunctionalized boron doped diamond electrodes, the signal tends to be unstable and variable both over time for an individual electrode and also from electrode to electrode.

It is an aim of certain embodiments of the present invention to solve one or more of the aforementioned problems.

SUMMARY OF INVENTION

According to one aspect of the present invention there is provided an electrochemical sensor comprising:
  a boron doped diamond electrode formed of boron doped diamond material;
  an array of non-diamond carbon sites disposed on a sensing surface of the boron doped diamond electrode;
  electrochemically active surface groups bonded to the non-diamond carbon sites for generating a redox peak associated with a target species which reacts with the electrochemically active surface groups bonded to the non-diamond carbon sites when a solution containing the target species is disposed in contact with the sensing surface in use;
  an electrical controller configured to scan the boron doped diamond electrode over a potential range to generate said redox peak; and
  a processor configured to give an electrochemical reading based on one or both of a position and an intensity of said redox peak.

According to another aspect of the present invention there is provided a diamond electrochemical sensor head for use in the aforementioned electrochemical sensor. The diamond electrochemical sensor head comprises:
- a boron doped diamond electrode formed of boron doped diamond material;
- an array of non-diamond carbon sites disposed on a sensing surface of the boron doped diamond electrode; and
- electrochemically active surface groups bonded to the non-diamond carbon sites for generating a redox peak associated with a target species which reacts with the electrochemically active surface groups bonded to the non-diamond carbon sites when a solution containing the target species is disposed in contact with the sensing surface in use,
- wherein sufficient electrochemically active surface groups are provided at the sensing surface of the boron doped diamond electrode to generate the redox peak associated with the target species without too much non-diamond carbon being provided at the sensing surface of the boron doped diamond electrode, whereby one or more of the following characteristics is achieved:
- the electrochemical sensor exhibits a solvent window which is not overly narrow, the solvent window having a potential range of at least 1.5 eV and no more than 3.5 eV (for example, at least 1.75 eV, 2.0 eV, or 2.25 eV and/or no more than 3.25 eV, 3.0 eV, or 2.75 eV and/or any combination of these upper and lower values), wherein the solvent window is defined as having a current density between $\pm 0.4$ mA $cm^{-2}$;
- the electrochemical sensor exhibits a capacitance which is not overly high, wherein the capacitance lies in a range 10 $\mu F$ $cm^{-2}$ to 50 $\mu F$ $cm^{-2}$ (for example, at least 12 $\mu F$ $cm^{-2}$, 15 $\mu F$ $cm^{-2}$, or 18 $\mu F$ $cm^{-2}$ and/or no more than 40 $\mu F$ $cm^{-2}$, 30 $\mu F$ $cm^{-2}$, or 25 $\mu F$ $cm^{-2}$ and/or any combination of these upper and lower values);
- the electrochemical sensor does not generate one or more interfering peaks at the position of the redox peak associated with the target species (e.g. the sensing surface comprises sufficiently low amounts of non-diamond carbon that oxygen is not reduced at the position where the redox peak occurs); and
- the electrochemical sensor exhibits a signal to background ratio for the redox peak associated with the target species which is at least 2.5 and preferably at least 3, 4, 5, 6, 7 or 8 (e.g. at a concentration of the target species in solution of 10 ppb, 100 ppb, 1 ppm, 10 ppm, 100 ppm, 0.1%, 1%, 2%, 3%, 4%, 7%, or 13%).

The present invention is based on the provision of controlled amounts of non-diamond carbon at the sensing surface of a boron doped diamond electrode. Electrochemically active surface groups bonded to the non-diamond carbon sites are provided for generating a redox peak associated with a target species which reacts with the electrochemically active surface groups bonded to the non-diamond carbon sites when a solution containing the target species is disposed in contact with the sensing surface in use. It is possible to reliably and accurately take a range of different types of electrochemical reading based on one or both of a position and an intensity of the redox peak with a good signal to noise ratio. It has surprisingly been found that such electrochemical sensor structures effectively combine the advantageous features of electrochemically inert boron doped diamond material with more electrochemically active non-diamond carbon having electrochemically active surface groups. The structures have electrochemical characteristics such as solvent window and capacitance parameters which are intermediate between boron doped diamond material and glassy carbon. Such structures are capable of generating a redox peak without undue background signal and/or interfering peaks from species such as dissolved oxygen.

One application of this electrochemical sensor technology is pH sensing. In this case, electrochemically active surface groups are provided which have a redox peak with a potential which changes with pH. The electrochemical sensor is provided with a processor which is configured to give a pH reading based on the position of the redox peak of the electrochemically active surface groups. For example, it has been found that boron doped diamond electrodes can be treated to form an array of non-diamond carbon sites which are functionalized with electrochemically active carbonyl containing groups such as quinone groups. If sufficient quinone groups are provided then a linear pH response can be achieved which can be Nernstian or near-Nernstian (i.e. a response gradient of $-0.059 \pm 0.01$) across a pH range of at least 2 to 10. Such a pH sensor can be configured to provide accurate and reproducible pH readings (e.g. a pH accuracy to at least 1, 0.5, or 0.1 pH units).

A similar pH functionality has previously reported for unfunctionalized glassy carbon electrodes. However, the catalytic activity of naturally occurring quinone groups on glassy carbon is such that oxygen reduction occurs in the potential range where quinone reduction occurs, and thus samples must be thoroughly degassed (e.g. for at least 20 minutes) prior to taking a measurement using a glassy carbon electrode to prevent interference from dissolved oxygen. In contrast, boron doped diamond material has a low catalytic activity which does not cause oxygen reduction in the potential range where quinone reduction occurs. Furthermore, it has surprisingly been found that if a low and controlled amount of non-diamond carbon is introduced into the surface of a catalytically inert boron doped diamond electrode and treated to form catalytically active surface groups, such as quinone groups, on the non-diamond carbon material, such an electrode is still sufficiently inert that oxygen reduction does not occur within the region of interest where quinone reduction occurs while still provided a linear pH response. This development provides a pH sensor which can produce a pH reading in a matter of seconds rather than requiring degassing of samples for at least 20 minutes for example. Furthermore, it also provided a pH sensor which can be used in the field where degassing of samples is not possible. Further still, the new diamond based pH sensor has several advantages over standard glass pH sensors which are fragile, subject to potential drift over time, and which are subject to alkali errors where interfering ions such as Na+ and Li+ affect the pH response (which is particularly problematic in sea water samples for example). The new diamond based pH sensor technology thus has several major advantages including:
- it is independent of dissolved oxygen and does not require a de-gassing process;
- free from interference by alkali metal errors, e.g. $Na^+$, $Li^+$, and trace $Cd^{2+}$, $Pb^{2+}$, $Hg^{2+}$, $Ca^{2+}$, $Ba^{2+}$, and/or $Mg^{2+}$;
- it works using the same instrumentation method as standard pH measurements, in this case the current peak potential on the potential axis is proportional to the pH of a solution measured against a reference electrode;
- it has high stability and repeatability to temperatures in excess of at least 200° C.; and in a local/in-situ measurement using pH generating electrodes the technique can be used as a reference itself.

In addition to the pH sensor application as described above, the functionalized diamond electrochemical sensors of the present invention can be used for electrochemically detecting and measuring various target species (e.g. ClO⁻). For example, the array of non-diamond carbon sites can produce a redox peak where the intensity of the redox peak is proportional to a concentration of the target species in solution. In this case, the electrochemical sensor can be provided with a processor which is configured to give a concentration reading for a target species of interest based on the intensity of the redox peak. Furthermore, such sensing applications benefit from similar advantageous technical effects to those described above in relation to the pH sensor application. Namely, the electrochemical sensor structures described herein effectively combine the advantageous features of electrochemically inert boron doped diamond material with more electrochemically active non-diamond carbon having electrochemically active surface groups thus allowing generation of redox peaks for target species of interest without undue background signal and/or interfering peaks. It is thus possible to achieve a high signal to background ratio for a target species in solution such that the target species can be reliably detected and measured even at low concentrations. The hybrid sp2/sp3 carbon sensor structures also enable target species which do not generate a signal using un-functionalized boron doped diamond (BDD) electrodes to be reliably detected and measured at low concentrations.

The hybrid sp2/sp3 carbon BDD electrode structures as described herein also benefit from being disposed in an electrically insulating diamond support matrix. It has been found that if a hybrid sp2/sp3 carbon BDD electrode is disposed in a non-diamond support matrix, the signal to background ratio can vary in use for certain applications. This is because a non-diamond support matrix can degrade over time (e.g. through polishing or exposure to chemically aggressive fluids) exposing side portions of the boron doped diamond electrode and increasing the amount of non-diamond carbon exposed at the sensing surface such that too much non-diamond carbon is exposed, thus increasing the background signal and reducing the single to background ratio. This problem can be avoided by embedding the hybrid sp2/sp3 carbon BDD electrode structures in an electrically insulating diamond support matrix. Such a configuration combines two advantageous features to reliably detect and measure target species which do not generate a signal using un-functionalized boron doped diamond electrodes: (i) a controlled/optimized concentration of non-diamond carbon at the sensing surface of the boron doped diamond electrode to provide a high signal to background ratio for the target species; and (ii) embedding the boron doped diamond electrodes in an electrically insulating diamond support matrix such that side surfaces of the boron doped diamond electrode do not become exposed in use thus altering the amount of exposed non-diamond carbon.

The required non-diamond carbon at the sensing surface of the boron doped diamond electrode can be provided in two main ways: (i) intrinsic non-diamond carbon incorporated into the boron doped diamond material during growth where the diamond growth is controlled to achieve the desired level of non-diamond carbon at the sensing surface; or (ii) post-synthesis surface treatment of the boron doped diamond material by, for example, laser patterning to provide a low and controlled quantity of non-diamond carbon at the sensing surface.

The specific amount of non-diamond carbon required at the sensing surface to achieve an optimized signal to background ratio will depend on the specific target species and concentration range to be detected and measured. The required amount of non-diamond carbon for a particular target species can be readily determined by fabricating boron doped diamond materials with a range of different concentrations of non-diamond carbon at the sensing surface and testing these to determine the optimum composition for the target species of interest.

The above described aspect of the present invention utilizes an electrically insulating diamond support matrix to ensure that edge portions of the boron doped diamond electrode are not exposed in use thus altering the amount of exposed non-diamond carbon. Of course, if the base boron doped diamond electrode material has a very low non-diamond carbon content then this problem is alleviated without the requirement of an electrically insulating diamond support matrix. This is because exposure of side edges using such a base electrode material will not significantly increase the amount of exposed non-diamond carbon. That is, if the base boron doped diamond electrode is inert to a target species of interest and a pattern of non-diamond carbon is introduced onto the sensing surface of such an inert boron doped diamond electrode, then such an electrode does not necessarily need to be encapsulated in an electrically insulating support matrix. That said, it should also be noted that if the BDD electrode is formed by a process which generates non-diamond carbon, such as laser cutting, then such a process may also generate non-diamond carbon on the side surfaces of the electrode which must be removed or reliably encapsulated to prevent exposure in use.

The bulk of the boron doped diamond electrode on which the non-diamond carbon surface pattern is disposed may comprise boron doped diamond material which has a boron content in a range $1 \times 10^{20}$ boron atoms cm⁻³ to $7 \times 10^{21}$ boron atoms cm⁻³ (for example, in a range $1 \times 10^{20}$ boron atoms cm⁻³ to $2 \times 10^{21}$ boron atoms cm³) and an sp2 carbon content, at least at exposed surfaces, which is sufficiently low as to not exhibit non-diamond carbon peaks in a Raman spectrum of the material. Using such an inert BDD base electrode material it is possible to introduce a low and controlled amount of sp2 non-diamond carbon on a catalytically inert sp3 carbon background.

BRIEF DESCRIPTION OF THE DRAWINGS

For a better understanding of the present invention and to show how the same may be carried into effect, embodiments of the present invention will now be described by way of example only with reference to the accompanying drawings, in which:

—FIG. 5 illustrates that the signal to background ratio is 5 for the polycrystalline boron doped diamond electrode which has been deliberately grown to contain controlled amounts of non-diamond carbon;

DETAILED DESCRIPTION OF CERTAIN EMBODIMENTS

Figure 1:
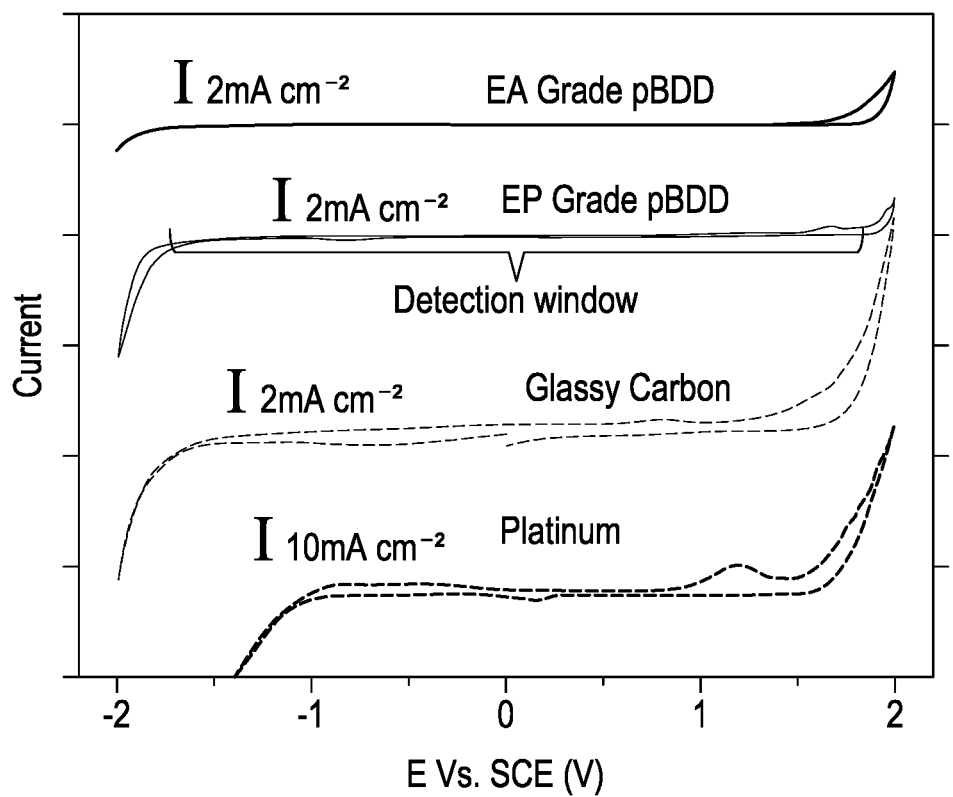
FIG. 1 shows a plot of current density versus applied potential for four different types of material: EA grade polycrystalline boron doped diamond material available from Element Six Ltd which has a very low non-diamond carbon content; EP grade polycrystalline boron doped diamond material available from Element Six Ltd which has a higher non-diamond carbon content than EA grade; glassy carbon; and platinum.

FIG. 1 illustrates why high quality, low non-diamond carbon content diamond material is advantageous over other materials for electrochemical analysis. As can be seen from the plot of current density versus applied potential, such a material has a wide, flat solvent window when compared to lower grades of boron doped diamond material, glassy carbon, or metal electrodes such as platinum. This provides a large detecting window, low background currents, and excellent signal resolution as well resistance to corrosion and fouling and the ability to operate in harsh environments.

Figure 2:
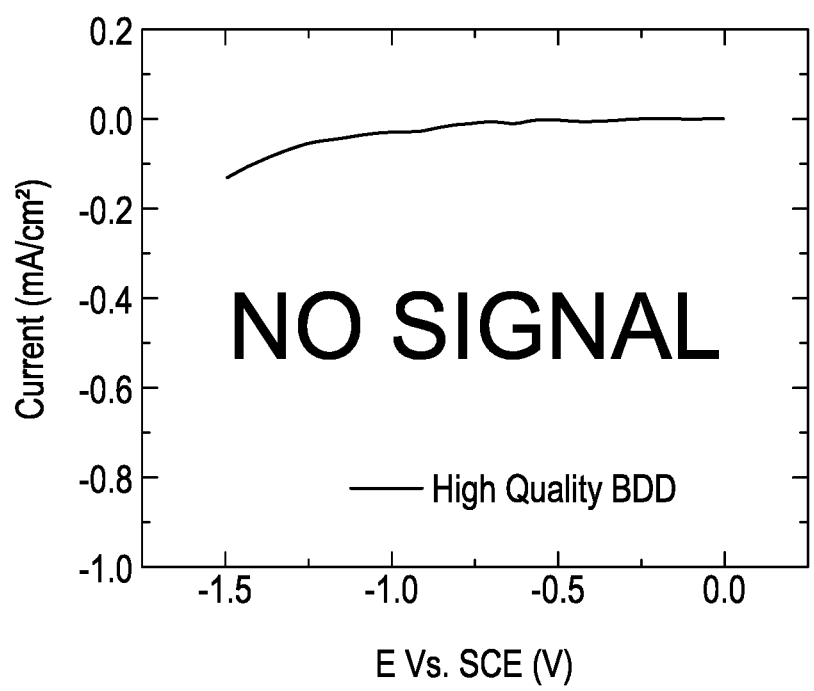
FIG. 2 show the response of low non-diamond carbon content polycrystalline boron doped diamond material in 13% NaOCl indicating that no signal is provided by the high quality boron doped diamond material without any functionalization (although a signal can be generated close to the edge of the solvent window, the signal being pushed outwards due to the fact that the surface is so electrochemically inert)

However, the downside to this stability and inert nature is a lack of electrocatalytic activity such that the electrode material is unable to detect certain target species such as OCl. This is illustrated by the lack of response shown in FIG. 2 for low non-diamond carbon content polycrystalline boron doped diamond material in 13% NaOCl which indicates that no signal is provided by the high quality boron doped diamond material without any functionalization (although a signal can be generated close to the edge of the solvent window, the signal being pushed outwards due to the fact that the surface is so electrochemically inert).

Figure 3:
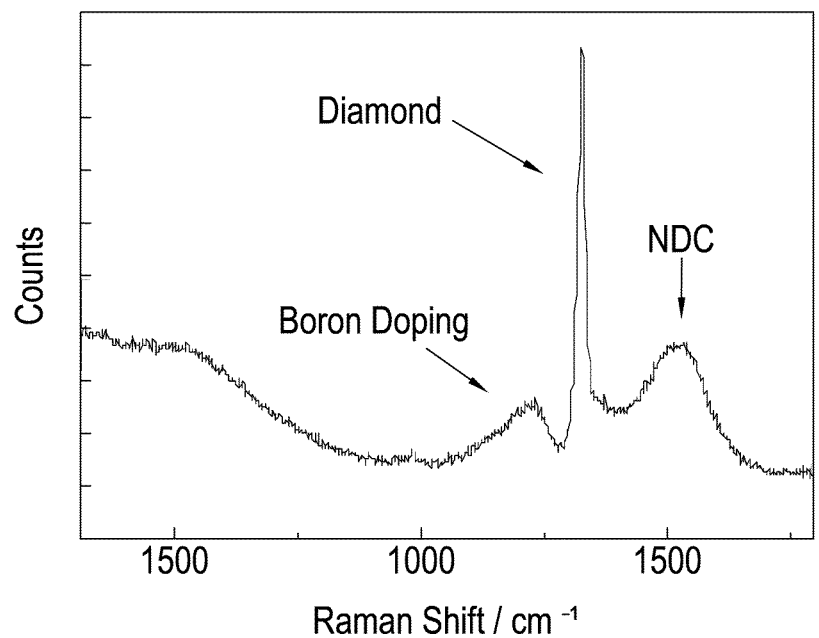
FIG. 3 shows a Raman spectrum for polycrystalline boron doped diamond material which has been deliberately grown to contain small amounts of non-diamond carbon.

It is known that during diamond growth non-diamond carbon can be incorporated into the diamond lattice. FIG. 3 shows a Raman spectrum for polycrystalline boron doped diamond material which has been deliberately grown to contain small amounts of non-diamond carbon. Peaks attributable to the sp3 diamond lattice, the boron doping, and the non-diamond carbon are clearly visible.

Figure 4:
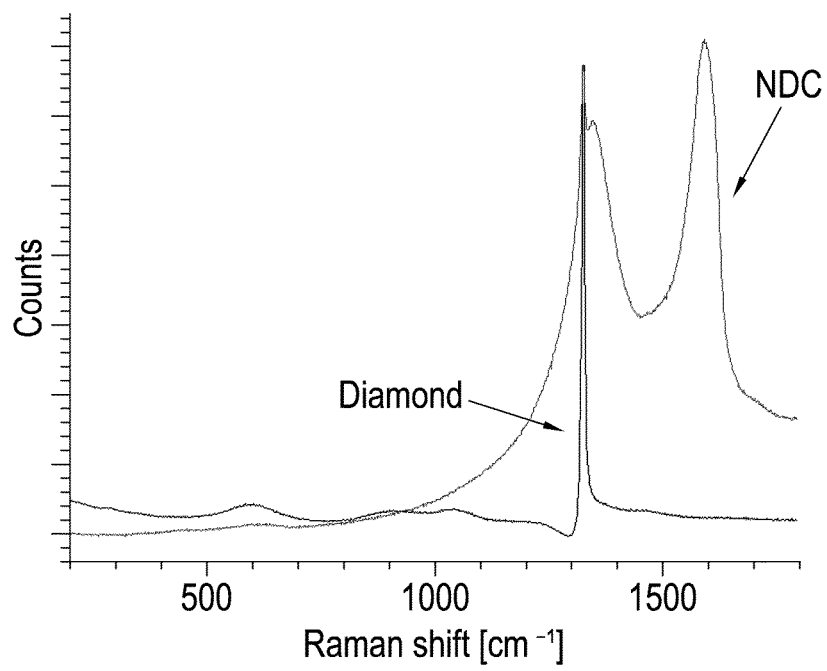
FIG. 4 shows a Raman spectrum for low non-diamond carbon content polycrystalline boron doped diamond material which has treated by laser patterning to introduce controlled amounts of non-diamond carbon onto the surface of the material.

It is also known that non-diamond carbon can be introduced onto the surface of a diamond material by post-synthesis treatments such as laser patterning. FIG. 4 shows a Raman spectrum for low non-diamond carbon content polycrystalline boron doped diamond material which has treated by laser patterning to introduce controlled amounts of non-diamond carbon onto the surface of the material. The diamond trace shows a large sp3 carbon peak while the overlying trace shows a non-diamond carbon peak attributable to surface graphitization by laser action. In this regard, it may be noted that acid cleaning after laser patterning can reduce the non-diamond carbon peak by removing sp2 carbon with the remaining non-diamond carbon being robustly bonded to the diamond electrode.

It is also known that boron doped diamond electrodes can detect species such as ClO$^-$ as described, for example, in Murata et al., "Electrochemical detection of free chlorine at highly boron-doped diamond electrodes", Journal of Electroanalytical Chemistry, Volume 612, Issue 1, 1 Jan. 2008, Pages 29-36. Here, the generation of a signal for ClO$^-$ can be attributed to non-diamond carbon in the boron doped diamond electrode as it is clear from FIG. 2 that if a high quality, low non-diamond carbon content boron doped diamond material is used for the electrode then the electrode is inert to such a target species due to lack of catalytic activity.

The present inventors have noted that although a signal can be generated for species such as ClO$^-$ using a boron doped diamond electrode which comprises significant quantities of non-diamond carbon, a significant background signal is also generated due to the presence of the non-diamond carbon and this leads to a reduced sensitivity to the detection and measurement of such target species. Surprisingly, the present inventors have found that if a very low and controlled amount of non-diamond carbon is provided at the sensing surface of a boron-doped diamond electrode then sufficient non-diamond carbon can be provided to produce a good signal for species such as ClO$^-$ while not unduly increasing the background. That is, there is an optimum range of non-diamond carbon content for such sensing applications where the target species is not detectable by a high quality, low non-diamond carbon content boron doped diamond material. It has also been found that oxidative pretreatments (e.g. electrochemical oxidative treatments) aid in obtaining a stable and reproducible signal for such non-diamond carbon functionalized boron doped diamond electrodes by providing suitable electrochemically active surface groups on the non-diamond carbon at the sensing surface.

An alternative way of viewing how the present invention works is in terms of the effect of non-diamond carbon on the solvent window of a boron doped diamond electrode. As shown in FIG. 1, the solvent window of a boron doped diamond material is reduced in width, as well as being made less flat, as the concentration of non-diamond carbon is increased. For target species which have an electrochemical peak near the edge of the solvent window, if too much non-diamond carbon is provided at the sensing surface of the boron doped diamond material then the solvent window is reduced too much and the signal for the target species is lost in the background signal for water electrolysis. Conversely, if too little non-diamond carbon is provided then the solvent window will be sufficient wide but no signal will be generated for target species which are inert to boron doped diamond material which has little or no non-diamond carbon. For target species which are only a little more reactive than water, such as ClO$^-$, there is a delicate balance to be struck between increasing the reactivity of the boron doped diamond electrode to the target species without increasing the reactivity of the boron diamond electrode too much that it reacts with water at the same potential thus masking the signal from the target species.

The specific amount of non-diamond carbon required at the sensing surface to achieve an optimized signal to background ratio will depend on the specific target species to be detected and measured. The required amount of non-diamond carbon for a particular target species can be readily determined by fabricating boron doped diamond materials with a range of different concentrations of non-diamond carbon at the sensing surface and testing these to determine the optimum composition for the target species of interest. For example, the signal to background ratio and the background current density may be measured using a concentration of the target species in solution of 0.1%, 1%, 2%, 3%, 4%, 7%, or 13%. While such test solutions of the target species can be used to characterize the functionality of the boron doped diamond electrodes as described herein, it should be noted that functionalized boron doped diamond electrodes as described herein can reliably detect and measure target species down to parts-per-million and even parts-per-billion concentration levels. As such, in real applications the functionalized boron doped diamond electrodes as described herein may conform to the background signal levels and signal-to-background ratios at concentrations for the target species of 10 ppb, 100 ppb, 1 ppm, 10 ppm, or 100 ppm with a range between 0 and 10 ppm being of particular interest for many applications.

Figure 5:
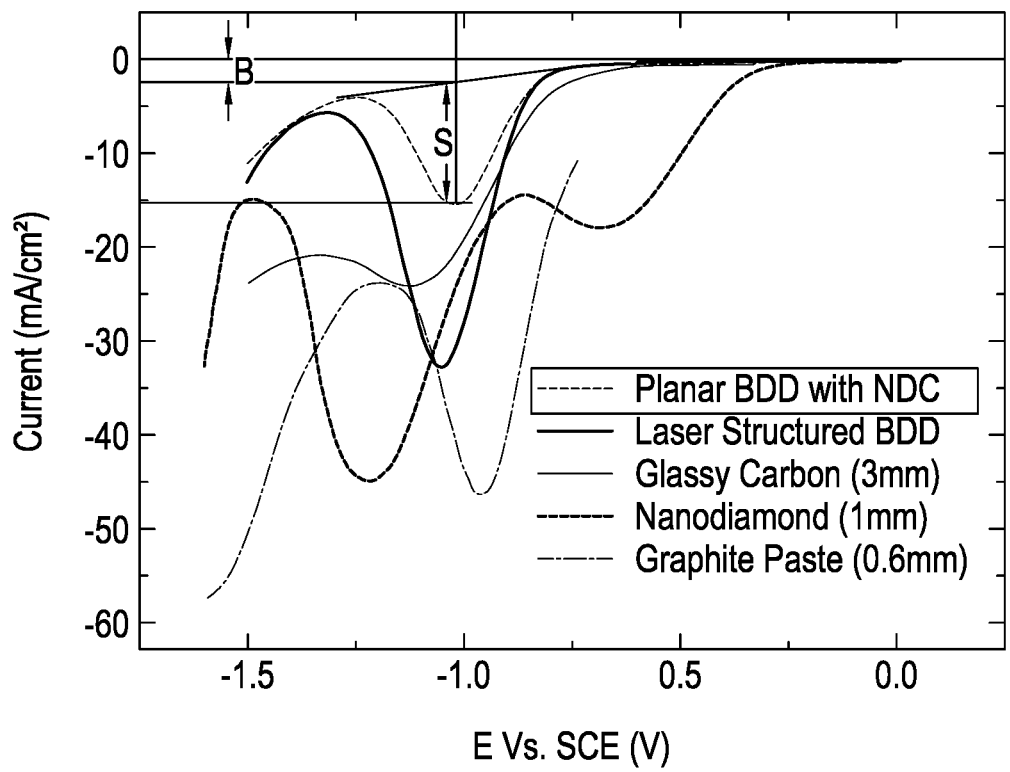
FIG. 5 shows the response to the target species ClO⁻ for five different types of electrode: polycrystalline boron doped diamond material which has been deliberately grown to contain controlled amounts of non-diamond carbon; low non-diamond carbon content polycrystalline boron doped diamond material which has treated by laser patterning to introduce controlled amounts of non-diamond carbon onto the surface of the material; glassy carbon; nanodiamond which contains significant quantities of non-diamond carbon; and graphite paste which contains large amounts of non-diamond carbon

FIG. 5 shows the response to the target species ClO$^-$ for five different types of electrode: polycrystalline boron doped diamond material which has been deliberately grown to contain controlled amounts of non-diamond carbon; low non-diamond carbon content polycrystalline boron doped diamond material which has treated by laser patterning to introduce controlled amounts of non-diamond carbon onto the surface of the material; glassy carbon; nanodiamond which contains significant quantities of non-diamond carbon; and graphite paste which contains large amounts of non-diamond carbon. The signal to background ratio can be calculated as illustrated in FIG. 5 and it is found that the signal to background ratio is 5 for the polycrystalline boron doped diamond electrode which has been deliberately grown to contain controlled amounts of non-diamond carbon. It may also be noted that the polycrystalline boron doped diamond material may be further optimized to increase the signal to background ratio to higher values. It should also be noted that $ClO^-$ is an example of a very challenging target species for which it is difficult to obtain a reasonable signal-to-noise ratio using traditional sensing systems.

Figure 6:
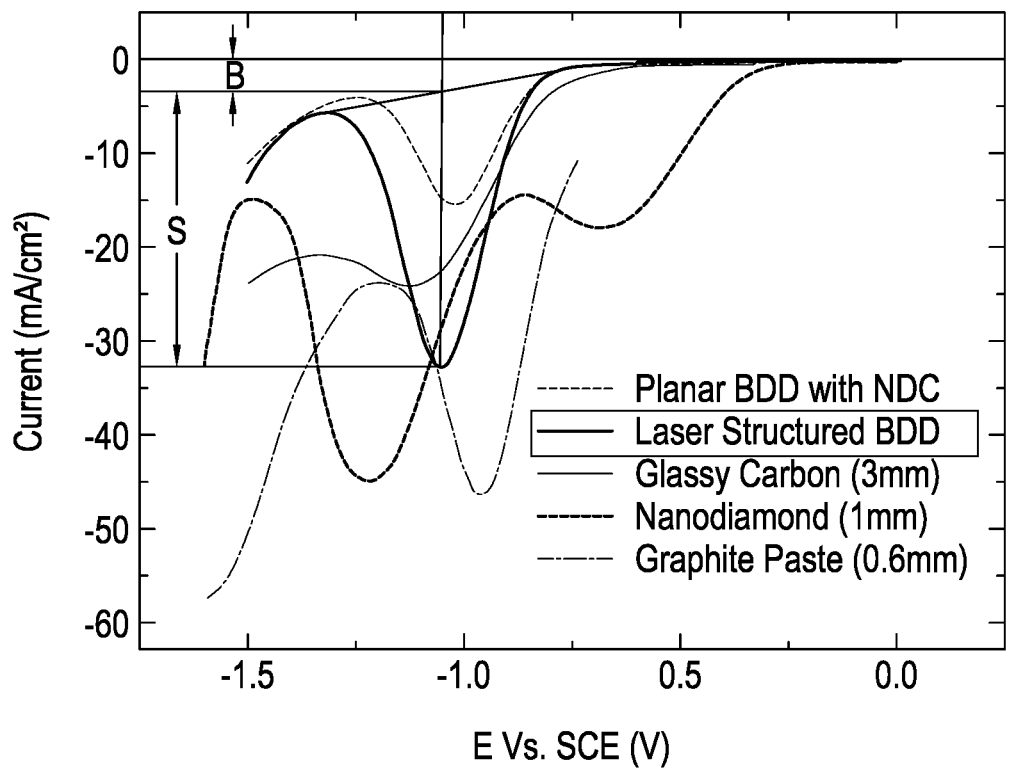
FIG. 6 shows the same data as FIG. 5 and illustrates that the signal to background ratio is 8.3 for the low non-diamond carbon content polycrystalline boron doped diamond material which has treated by laser patterning to introduce controlled amounts of non-diamond carbon onto the surface of the material.

FIG. 6 shows the same data as FIG. 5 and illustrates that the signal to background ratio is 8.3 for the low non-diamond carbon content polycrystalline boron doped diamond material which has treated by laser patterning to introduce controlled amounts of non-diamond carbon onto the surface of the material.

As such, FIGS. 5 and 6 illustrated that a high signal to background ratio can be achieved via intrinsic non-diamond carbon introduced into the boron doped diamond material during synthesis or by post-synthesis treatment to provide controlled quantities of non-diamond carbon on the sensing surface of a low non-diamond carbon content boron doped diamond material.

Figure 7:
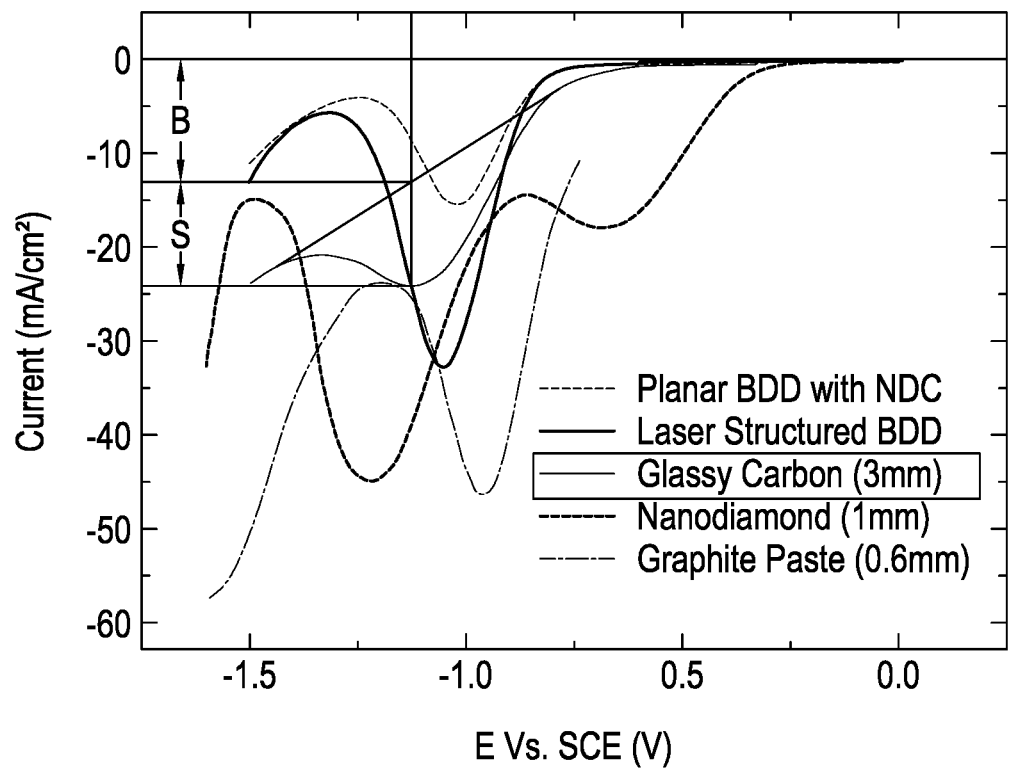
FIG. 7 shows the same data as FIG. 5 and illustrates that the signal to background ratio is 0.8 for the glassy carbon electrode.
Figure 8:
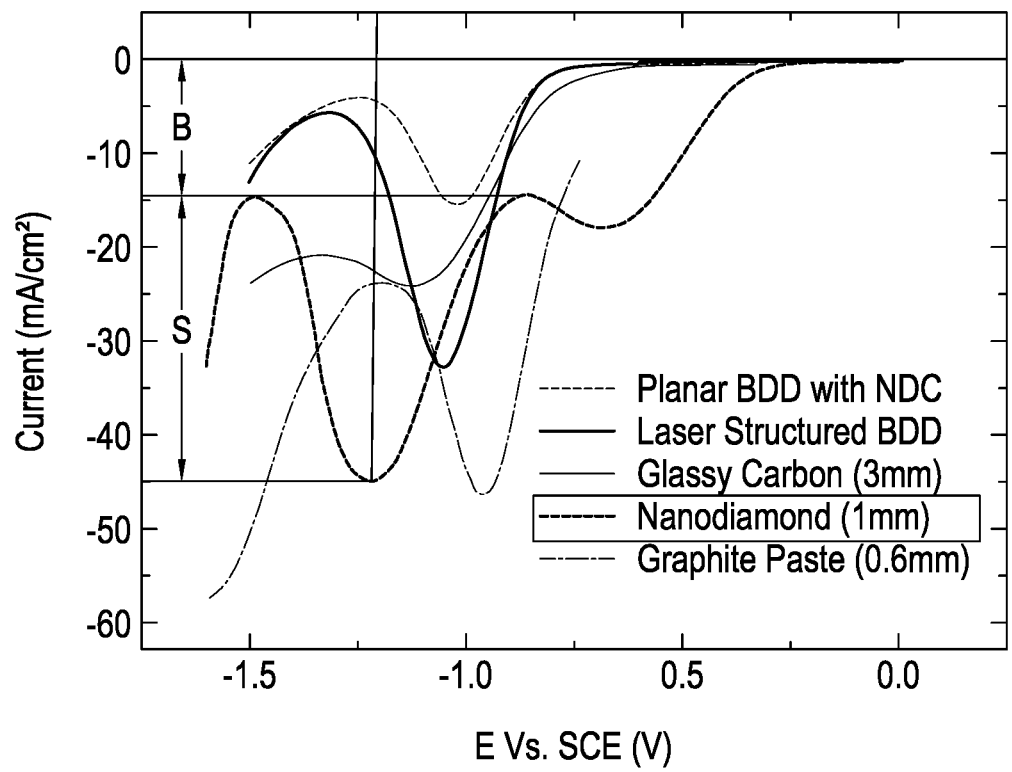
FIG. 8 shows the same data as FIG. 5 and illustrates that the signal to background ratio is 2 for the nanodiamond electrode which contains significant quantities of non-diamond carbon.
Figure 9:
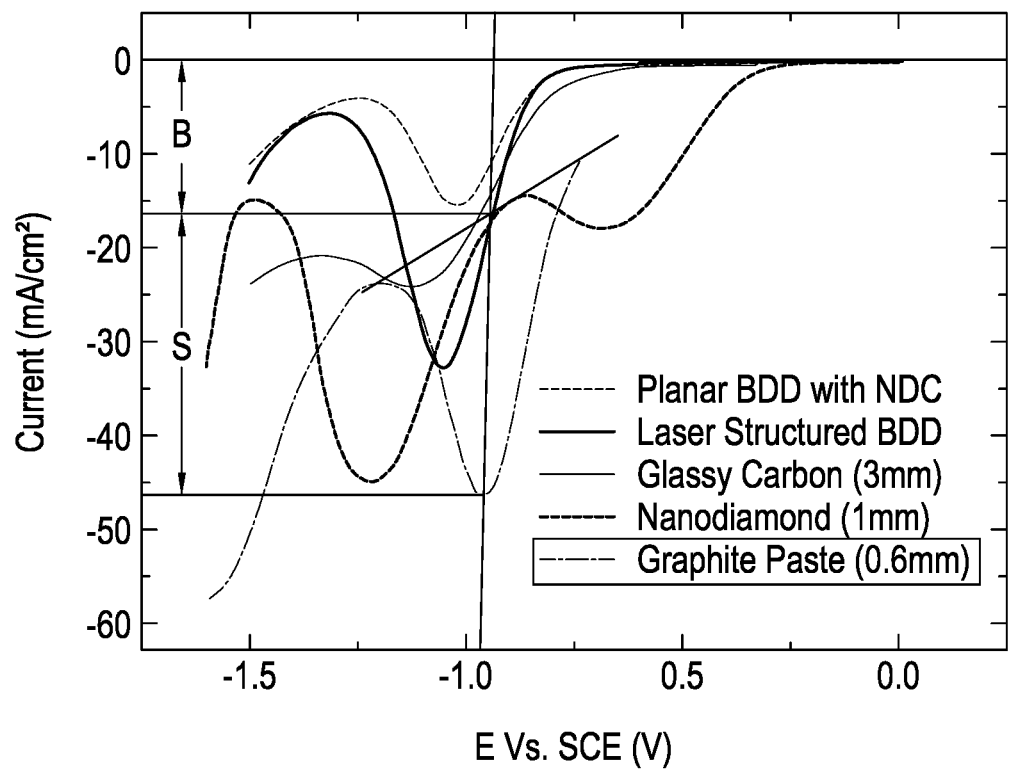
FIG. 9 shows the same data as FIG. 5 and illustrates that the signal to background ratio is 1.8 for the graphite paste electrode which contains large amounts of non-diamond carbon.

In contrast, FIGS. 7 to 9 show the same data as FIG. 5 and illustrate that the signal to background ratio is only 0.8 for a glassy carbon electrode, 2 for a nanodiamond electrode which contains significant quantities of non-diamond carbon, and 1.8 for the graphite paste electrode which contains large amounts of non-diamond carbon.

In light of the above, it is evident that by controlling the non-diamond carbon content at the sensing surface of a boron doped diamond electrode it is possible to provide a much improved signal to background ratio and thus achieve a higher sensitivity for target species such as $ClO^-$. While diamond with a significant amount of carbon can achieve a signal to background ratio of 2, by providing low and controlled amounts of non-diamond it is possible to achieve a signal to background ratio of at least 2.5 and more preferably at least 3, 4, 5, 6, 7, or 8. Furthermore, while the background signal and peak current density is greater than $\pm 10$ mA/cm$^2$ for other electrode materials, by providing low and controlled amounts of non-diamond it is possible to achieve a background current density at the peak current density for the target species which is no more than $\pm 10$ mA/cm$^2$, $\pm 8$ mA/cm$^2$, $\pm 6$ mA/cm$^2$, $\pm 4$ mA/cm$^2$, or $\pm 3$ mA/cm$^2$.

The effect as described above has been illustrated for the target species $ClO^-$. Traditionally, free chlorine detection involves titrimetric or UV analysis which is slow, involves multiple steps, and is performed off-line. In contrast, electrochemical detection can be performed online and is cheap, fast and reliable. In principle free chlorine is easily electrochemically detected via the reaction:

$$OCl^- + H_2O + 2e^- \rightarrow Cl^- + 2OH^-$$

However, traditional electrode materials are not suitable as oxides form on simple contact with free chlorine in solution and the electrodes are prone to passivation and fouling. Furthermore, reduction of naturally present oxygen can also be problematic. In contrast, the functionalized boron-doped diamond electrodes of the present invention are not prone to such problems and have been shown to produce excellent signal to background responses if the non-diamond carbon content of such electrodes is suitably controlled.

It will be appreciate that while the effect as described above has been illustrated for the target species $ClO^-$, and particularly utilizing a single peak of this species at between $-0.5$ and $-1.5$ volts, the effect can also be utilized for other target species which are catalysed by non-diamond carbon but which are inert to boron doped diamond material which has little or no non-diamond carbon.

The aforementioned finding is an important contribution in itself to the art of electrochemical sensing. In addition, the present inventors have also found that the functionality of boron-doped diamond electrodes comprising low and controlled non-diamond carbon content as described herein can degrade over time and can be variable from electrode to electrode. In particular, these problems have been observed for functionalized boron doped diamond electrodes mounted in a glass or epoxy sealed sensor configuration. It would appear that in use the glass or epoxy mounting material can degrade around the edge of a functionalized boron doped diamond electrode exposing more non-diamond carbon around the edge of the functionalized boron doped diamond electrode. It is difficult to co-planar seal a boron doped diamond electrode in a non-diamond support and repeated polishing and/or strong etching solutions lead to more of the side walls of the boron doped diamond electrode being exposed. Since the amount of non-diamond carbon required to achieve the optimized response is small, this can lead to a significant deviation from the optimum quantity of exposed non-diamond carbon at the sensing surface and leads to a degradation in the signal to background ratio. As such, the present inventors have realized that to avoid this problem it is advantageous to mount the functionalized boron doped diamond electrode in an electrically insulating diamond support matrix. The electrically insulating diamond support matrix does not degrade with respect to boron doped diamond electrode material and thus the quantity of exposed non-diamond carbon remains stable.

Methods for mounting boron doped diamond electrodes in an electrically insulating diamond support matrix are known in the art (see, for example, WO2005/012894 and WO2012/156203). Ideally the boron doped diamond electrodes are mounted so as to be co-planar with the electrically insulating diamond support matrix. Non-diamond sp2 bonded carbon has been shown to achieve catalytic activation in diamond enabling the detection of species such as persulphates, ozone, hypochlorous acid, and hypochlorite. What is new here is the finding that a low and controlled non-diamond carbon content at the sensing surface of a boron doped diamond electrode in combination with diamond encapsulation can provide an electrode configuration which is capable of reliably detecting and measuring low concentrations of such target species. For example, the present diamond sensor head configuration can be used to detect free chlorine in the range 0 to 10 ppm. Furthermore, it has been found that such functionalized boron doped diamond electrodes are stable in use.

A variety of fabrication technique can be utilized to fabricate the diamond electrochemical sensor heads as described herein including one or more of the following:

1. Micro arrays of NDC dots, bands, or other shapes may be provided within a supporting matrix of high quality boron doped diamond to maximise signal current by, for example, laser patterning. The functionalized area may be controlled to maximise analyte signal against background reactions.

2. Areas of sp2 rich diamond can be provided by forming indents or trenches into a boron doped diamond electrode, overgrowing an sp2 rich diamond layer, and then processing back the sp2 rich diamond layer to leave isolated areas of sp2 rich diamond within the original indents or trenches formed in the boron doped diamond electrode.
3. Diamond synthesis conditions, morphology, and methane concentration can be controlled to achieve regions of sp2 rich diamond which are intrinsic to the grade of diamond material.
4. Regions of sp2 carbon within a boron doped diamond material can be exposed to controlled post-synthesis surface processing.
5. Post-synthesis graphitisation techniques such as thermal treatments, laser micro-machining, or hot metal treatments (e.g. deposition of metal nano particles and subsequent heating to induce graphitisation) may be applied to a base boron doped diamond material.
6. Post-synthesis oxidation treatments can be applied to remove excess none bonded sp2 carbon if the starting material has too much exposed non-diamond carbon and/or to remove sp2 carbon which is only loosely bound to the diamond electrode such that the remaining non-diamond carbon is robust.

While some of the aforementioned methods utilize boron doped diamond materials which comprising some intrinsic non-diamond carbon formed during synthesis, certain methods start with a base boron doped diamond material which has a high boron content and a low sp2 carbon content material as described in WO2013/135783 as this enables one to then introduce a low and controlled amount of non-diamond carbon in a reproducible manner and de-couples the required amount of non-diamond carbon from the diamond synthesis process. As such, the bulk of the boron doped diamond electrode on which the non-diamond carbon surface pattern is disposed may comprise boron doped diamond material which has a boron content in a range $1 \times 10^{20}$ boron atoms $cm^{-3}$ to $7 \times 10^{21}$ boron atoms $cm^{-3}$ and an sp2 carbon content which is sufficiently low as to not exhibit non-diamond carbon peaks in a Raman spectrum of the material.

An additional advantage of starting with an inert boron doped diamond material which has little or no non-diamond carbon content is that the material can then be patterned with non-diamond carbon such that the spacing between areas of non-diamond carbon is well controlled in addition to controlling the concentration of non-diamond carbon. For example, regions of non-diamond carbon can be spaced apart with a spacing approximately equal to the diffusion path length such that the regions of non-diamond carbon function as a microelectrode array. This is possible if the base boron doped diamond material does not interact with the target species but isolated regions of non-diamond carbon do interact with the target species. In this respect, patterning regions of non-diamond carbon into an inert boron doped diamond material is advantageous over a less controlled non-diamond carbon distribution such as one provided by the diamond synthesis process.

Another advantage of starting with an inert boron doped diamond material which has little or no non-diamond carbon content is that exposure of side edges using such a base electrode material will not significantly increase the amount of exposed non-diamond carbon (unless coated with sp2 carbon due to laser cutting). That is, if the base boron doped diamond electrode is inert to a target species of interest and a pattern of non-diamond carbon is introduced onto the sensing surface of such an inert boron doped diamond electrode, then such an electrode does not necessarily need to be encapsulated in an electrically insulating support matrix. As such, a diamond electrochemical sensor head can be provided which does not necessarily require a diamond support matrix. Such a diamond electrochemical sensor head comprises:

a boron doped diamond electrode formed of boron doped diamond material which is electrochemically inert to a target species in solution; and an array of non-diamond carbon sites disposed on a sensing surface of the boron doped diamond electrode, wherein the size and distribution of the non-diamond carbon sites on the sensing surface of the boron doped diamond electrode is such that the diamond electrochemical sensor head provides one or both of:

a signal to background ratio for current density of the target species in solution of at least 2.5, 3, 4, 5, 6, 7, or 8; and a background current density at a peak current density for the target species of no more than $\pm 10$ $mA/cm^2$, $\pm 8$ $mA/cm^2$, $\pm 6$ $mA/cm^2$, $\pm 4$ $mA/cm^2$, or $\pm 3$ $mA/cm^2$.

For example, the bulk of the boron doped diamond electrode on which the non-diamond carbon surface pattern is disposed may comprise boron doped diamond material which has a boron content in a range $1 \times 10^{20}$ boron atoms $cm^{-3}$ to $7 \times 10^{21}$ boron atoms $cm^{-3}$ and an sp2 carbon content, at least at exposed surfaces, which is sufficiently low as to not exhibit non-diamond carbon peaks in a Raman spectrum of the material. Edges of such a boron doped diamond material may be polished in addition to the provision of a polished main sensing surface. The array of non-diamond carbon sites disposed on the sensing surface of such a base electrode material may comprise a plurality of isolated non-diamond carbon sites each having a size in a range 10 nm to 100 micrometres.

Figure 10:
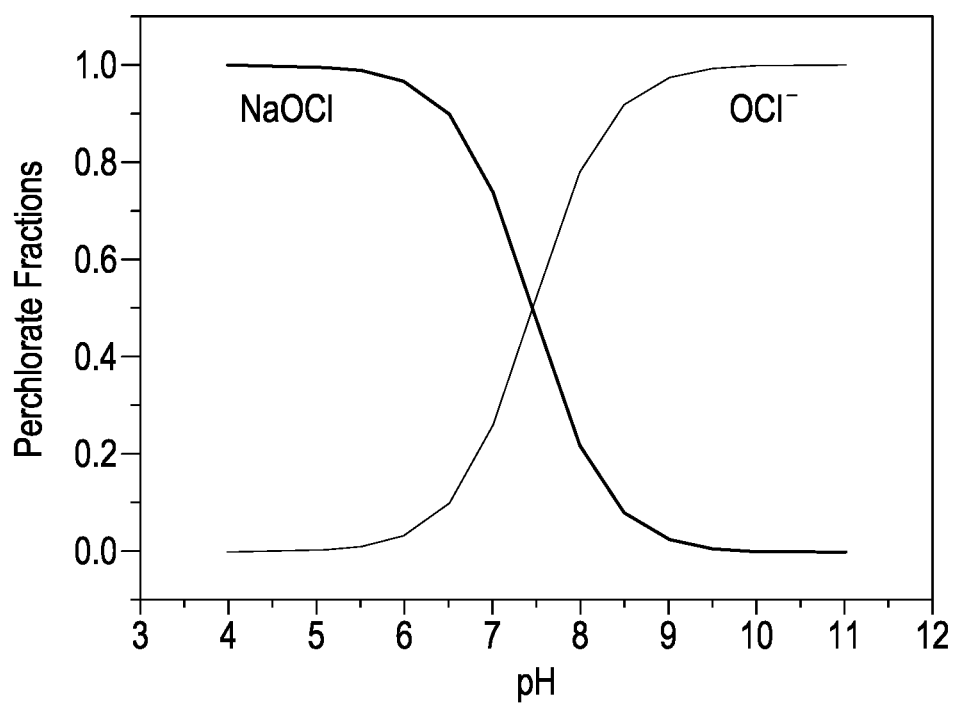
FIG. 10 shows how the speciation of NaOCl changes with pH.

The diamond electrochemical sensor heads as described herein may also comprise one or more further boron doped diamond electrodes. For example, the diamond electrochemical sensor heads may comprise one or more further boron doped diamond electrodes which comprise less non-diamond carbon than the boron doped diamond electrode which is functionalized with non-diamond carbon. A non-functionalized electrode can be used to generate target species to be sensed by the functionalized electrode and/or to change the pH of the local environment to optimize the concentration of target species to be sensed. For example, FIG. 10 shows how the speciation of NaOCl changes with pH and indicates that ClO⁻ is generated at high pH. As such, for ClO⁻ sensing it is advantageous to increase the pH to more than 10 as the ClO⁻ form is electrochemically active. In this regard, a secondary non-functionalized electrode, such as a ring electrode around a functionalized disc electrode, can be used to change the pH over the functionalized sensing electrode.

The sensor technology can be used in a variety of applications and for a variety of target species of interest. For example, the diamond sensor technology as described herein can be used as part of a sanitation dosing system to maintain concentrations of chlorine in a tight range of, for example, 1±0.5 ppm in a ballast water treatment system. Furthermore, the sensor technology can be utilized for pH sensing as indicated in the summary of invention section and discussed in more detail below.

pH is fundamental to the study of chemical environments and is therefore prevalent in many industries including medicine, waste management, water and environmental monitoring. The most prevalent pH sensor is the glass pH sensor which has a pH range from −1 to 12. The glass pH sensor has a number of advantageous features including high sensitivity to protons, a large analysable pH range, a quick response time, and is readily commercially available. However, the glass pH sensor does have a number of disadvantages including fragility, potential drift over time, and alkali errors where interfering ions such as Na+ and Li+ affect pH response (which is particularly problematic in sea water for example).

Figure 11A:
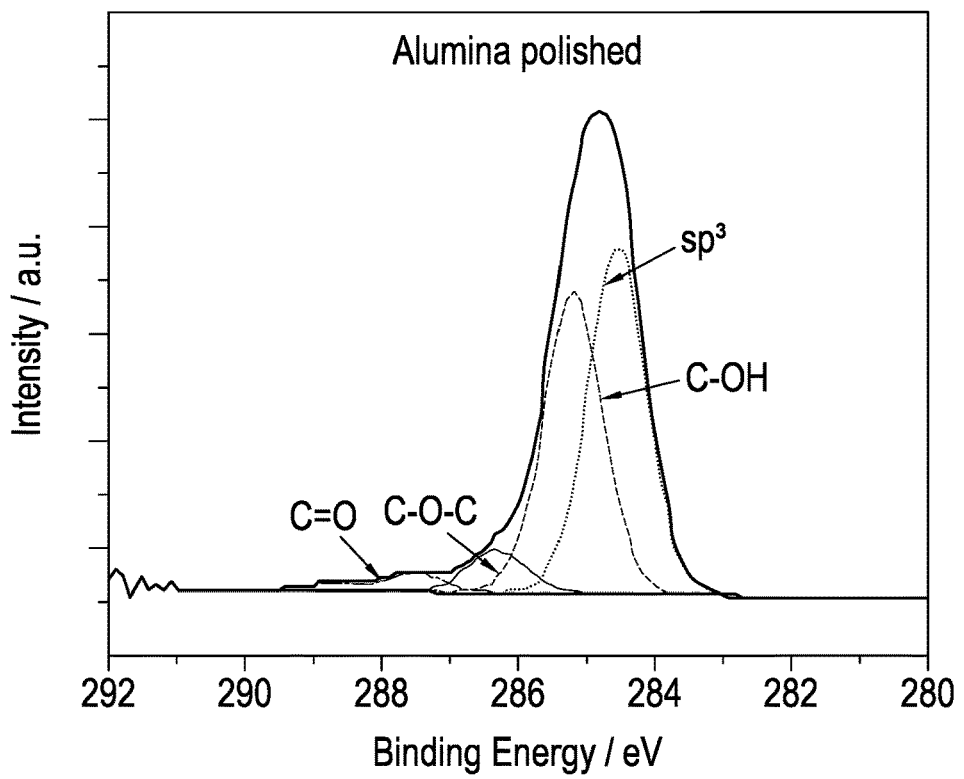
FIG. 11(a) shows an x-ray photoelectron spectrum of the surface of an alumina polished, oxygen terminated polycrystalline boron doped diamond material and the contributions made by different surface groups.
Figure 11B:
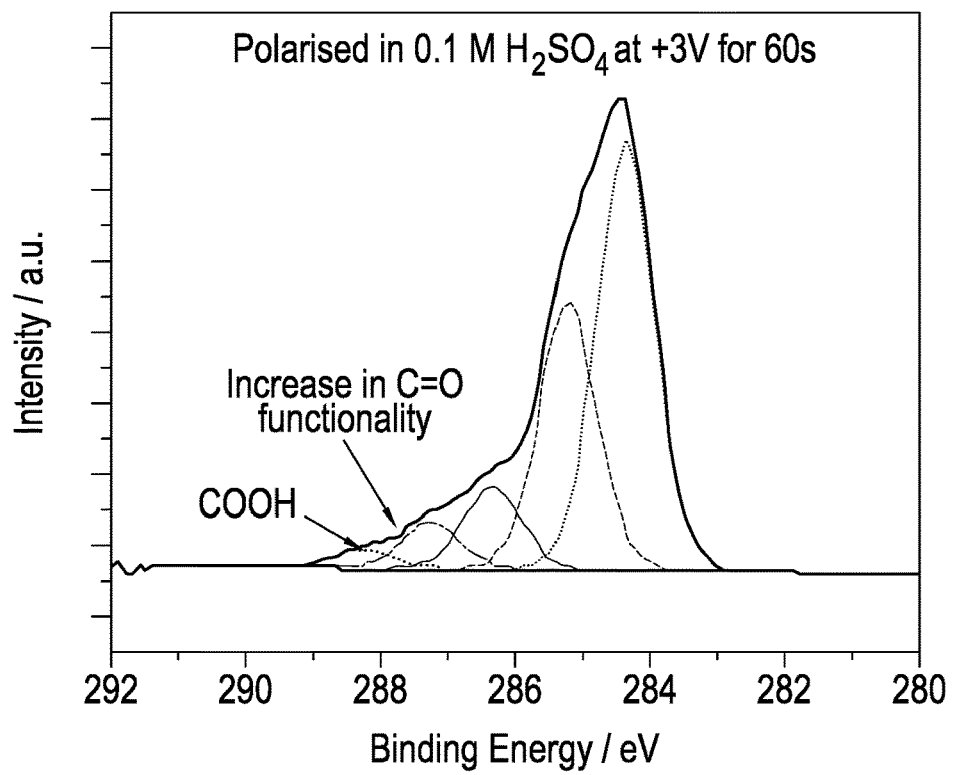
FIG. 11(b) shows an x-ray photoelectron spectrum of the surface of an alumina polished, oxygen terminated polycrystalline boron doped diamond material which has been further treated by polarizing in 0.1 M $H_2SO_4$ at +3 V for 60 seconds.

The present inventors have investigated whether boron doped diamond electrodes could be used as a pH sensor. In particular, the present inventors have identified that the presence of carbonyls on the surface of oxygen-terminated boron doped diamond is a possible way to use boron doped diamond as a pH sensor, as carbonyls, such as quinones, can interact with hydrogen ions and show a pH dependent redox response. In this regard, FIG. 11(a) shows an x-ray photoelectron spectrum of the surface of an alumina polished, oxygen terminated polycrystalline boron doped diamond material and the contributions made by different surface groups. FIG. 11(b) shows an x-ray photoelectron spectrum of the surface of an alumina polished, oxygen terminated polycrystalline boron doped material which has been further treated by polarizing in 0.1 M $H_2SO_4$ at +3 V for 60 seconds. Both spectra shown in FIGS. 11(a) and 11(b) are C 1 s XPS spectra on 1 mm polycrystalline boron doped diamond electrodes with a 50 micrometre spot size. The spectra show that anodic polarisation increases the number of carbonyl groups.

Figure 12A:
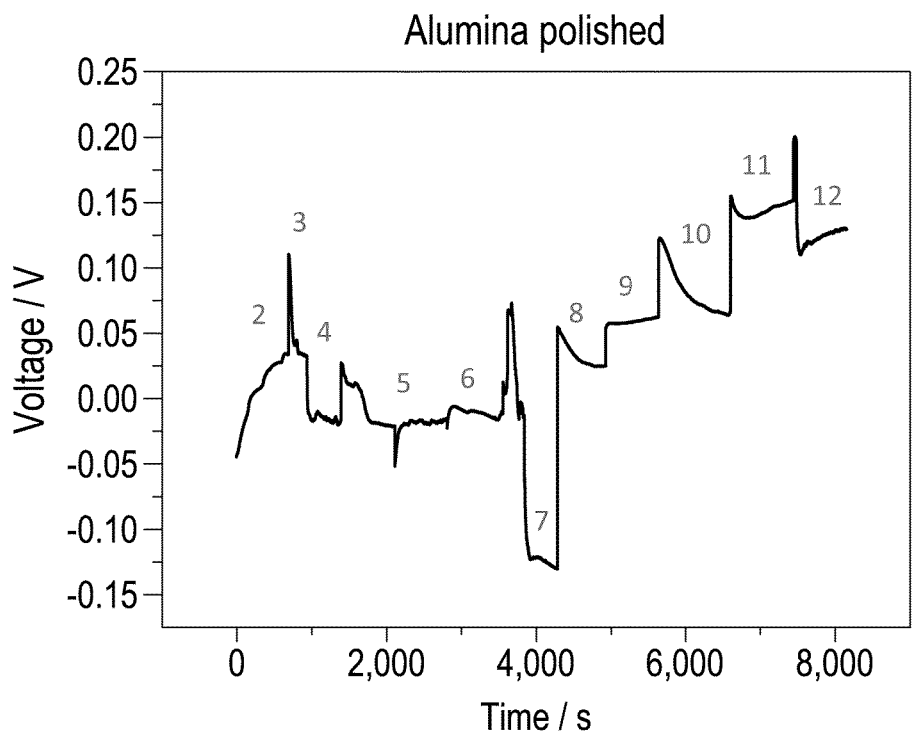
FIG. 12(a) shows data for open circuit potential measurements of boron doped diamond electrodes which have been alumina polished.
Figure 12B:
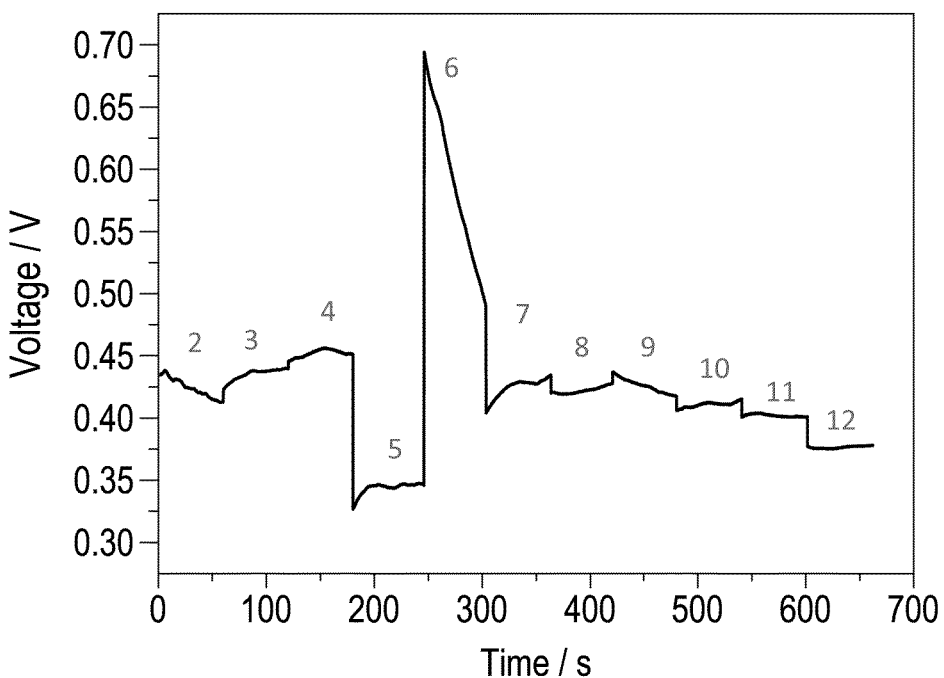
FIG. 12(b) shows data for open circuit potential measurements of boron doped diamond electrodes which have been polarised in 0.1 M $H_2SO_4$ at +3 V for 60 seconds.

The boron doped diamond electrodes were tested as potential pH sensors by taking open circuit potential measurements in different pH buffers. Different types of boron doped diamond electrodes were investigated and various polarisation times were investigated. However, no obvious pH sensitivity was observed and the data was not repeatable even with anodically treated boron doped diamond. In this regard, FIGS. 12(a) and 12(b) show data for open circuit potential measurements of boron doped diamond electrodes which have been alumina polished (FIG. 12(a)) and polarised in 0.1 M $H_2SO_4$ at +3 V for 60 seconds (FIG. 12(b)). As such, it has been concluded that this open circuit measurement approach to pH sensing using boron doped diamond electrodes is not a viable route, at least using these types of boron doped diamond material.

Figure 13:
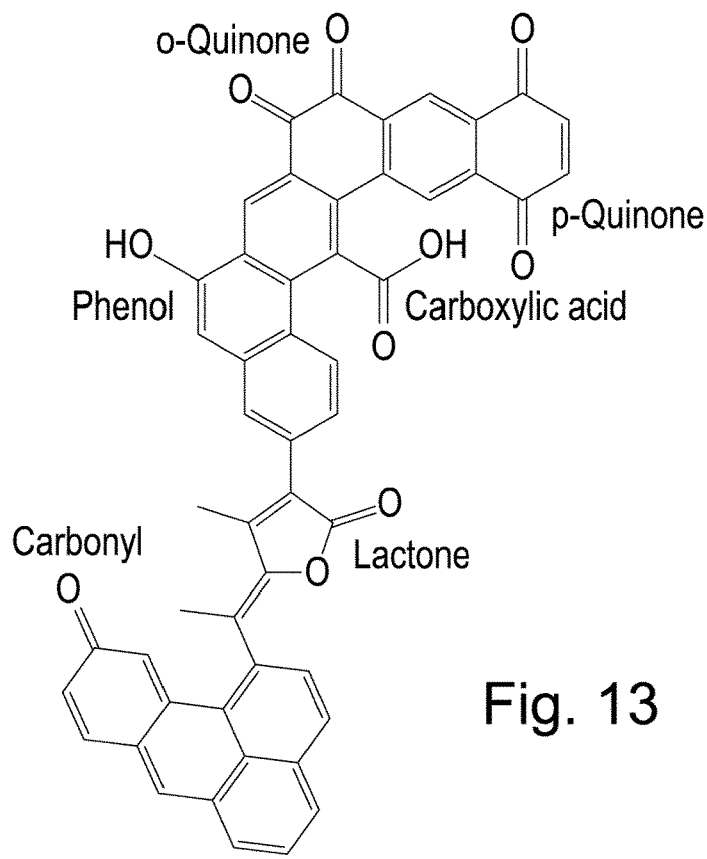
FIG. 13 shows various surface functional groups which are present on glassy carbon electrodes including various types of carbonyl containing groups.
Figure 14:
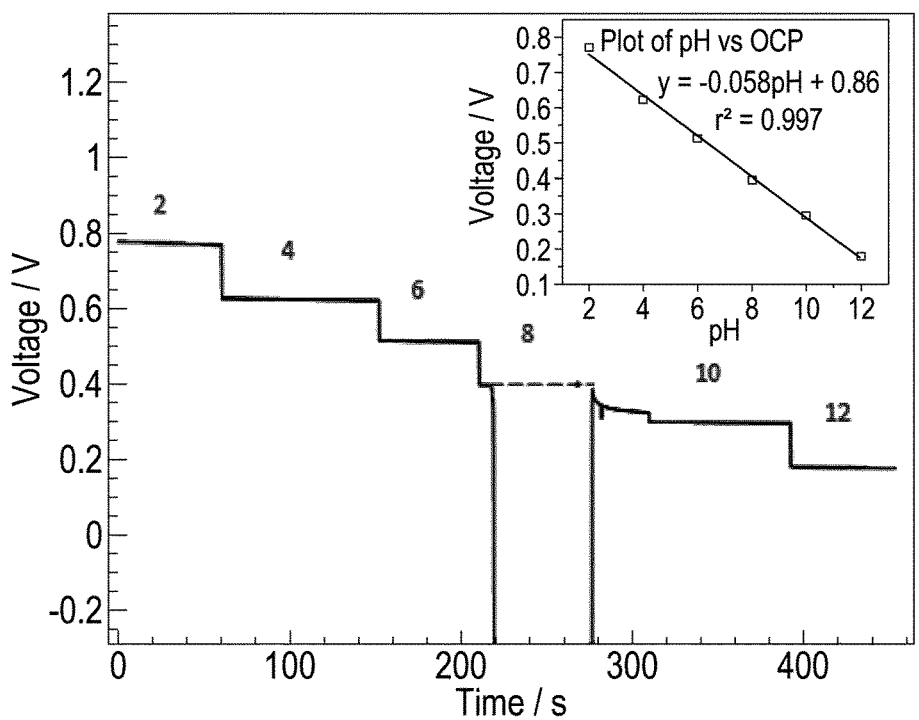
FIG. 14 shows an open circuit potential measurement for glassy carbon polarised at +3 V for 10 seconds in 0.1 M $H_2SO_4$ with the inset showing a plot of pH vs open circuit potential.

In contrast to boron doped diamond material, the literature suggests that non diamond carbon in the form of glassy carbon electrodes can be used as a pH sensor. In this regard, various surface functional groups are present on glassy carbon electrodes including various types of carbonyl containing groups as shown in FIG. 13 (see, for example, Lu, M., Compton, G. R., Analyst, 2014, 139, 2397 and Lu, M., Compton, G. R., Analyst, 2014, 139, 4599-4605). FIG. 14 shows an OCP for glassy carbon polarised at +3 V for 10 s in 0.1 M $H_2SO_4$ with the inset showing a plot of pH vs OCP. In this regard, the Nernst theory equation dictates that at 298 K, 1 change in pH unit=59 mV. For glassy carbon, the gradient is 58 mV indicating a Nernstian response.

Figure 15:
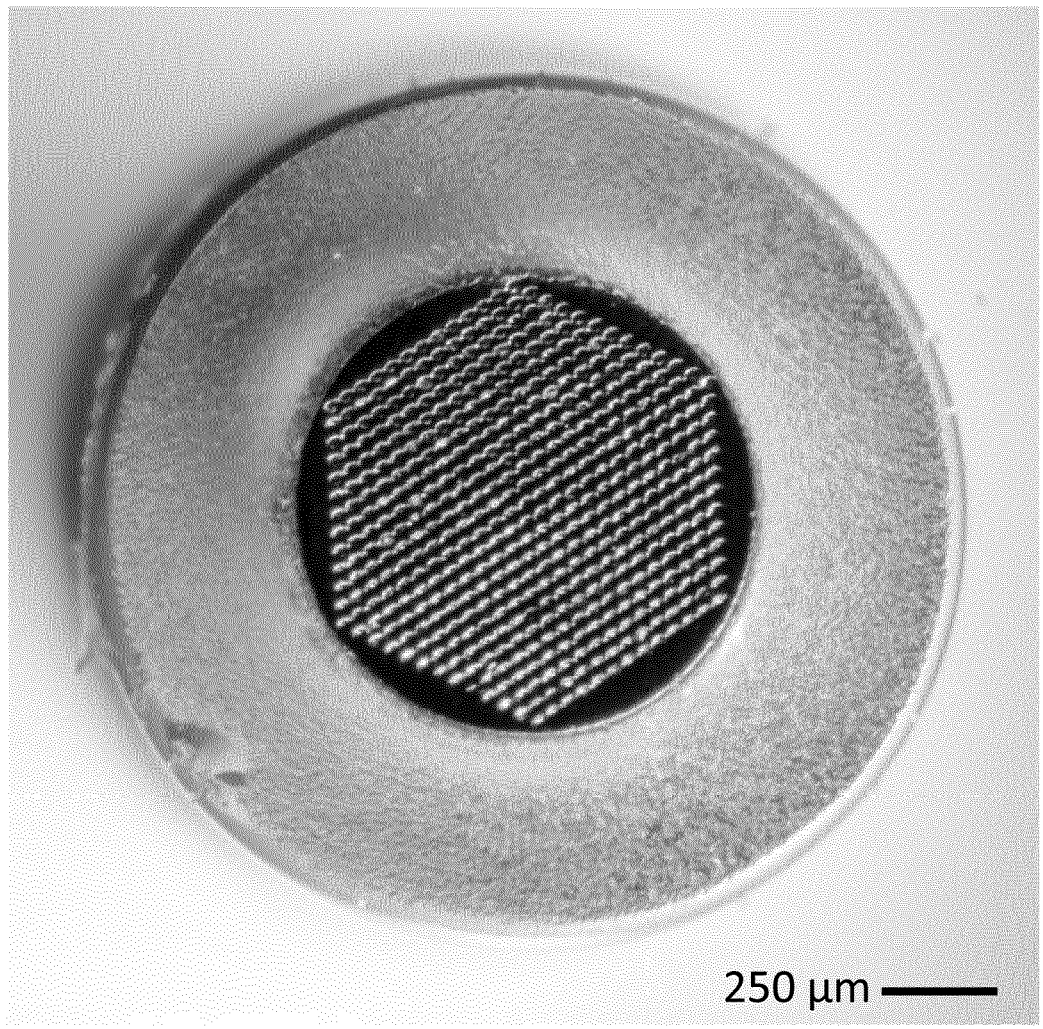
FIG. 15 shows laser features introduced into a glass sealed polycrystalline boron doped diamond macroelectrode.
Figure 16A:
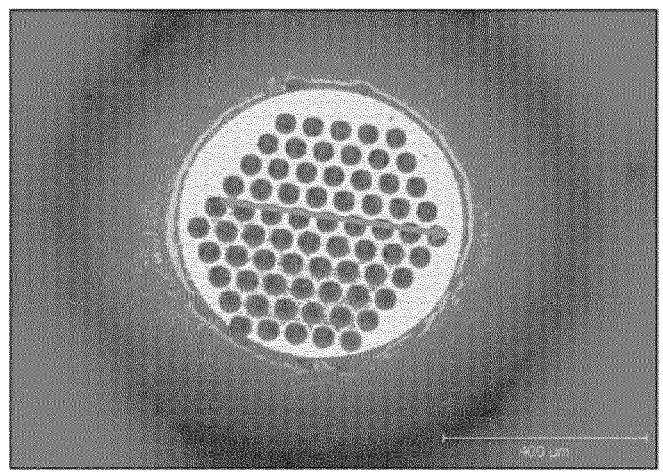
FIGS. 16(a) and 16(b) also show laser patterns in a 1 mm polycrystalline boron doped diamond electrode.
Figure 16B:
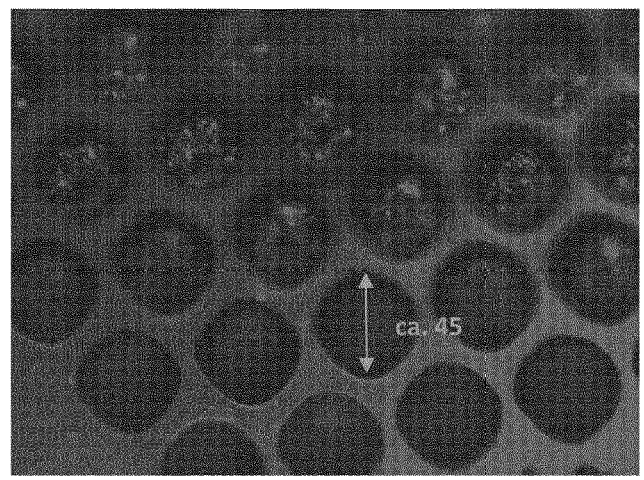
Figure 16C:
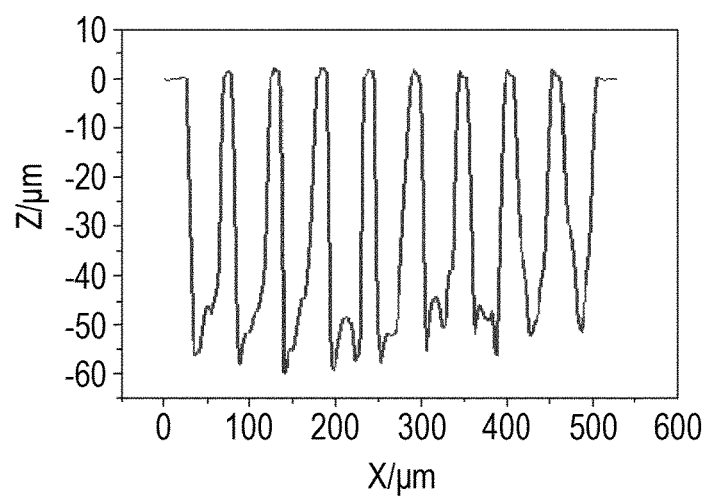
FIG. 16(c) shows interferometry data on the boron doped diamond electrodes indicating lasered pits of approximately 45 micrometres wide and approximately 50 micrometres deep.

Since non-diamond carbon in the form of glassy carbon can be used as a pH sensor, the present inventors have investigated what effect introducing $sp^2$ carbon to a boron doped diamond electrode will have in sensing pH. In this regard, laser ablation has been investigated as a means of introducing intentional $sp^2$ carbon into a boron doped diamond electrode in order to measure pH. FIG. 15 shows laser features introduced into a glass sealed polycrystalline boron doped diamond macroelectrode. FIGS. 16(a) and 16(b) also show laser patterns in a 1 mm polycrystalline boron doped diamond electrode. A hexagonal array of laser features are formed followed by acid cleaning and sonication after laser patterning to remove any loose $sp^2$ from the surface of the diamond material. A hot acid treatment may also function to activate the non-diamond carbon surface as well as removing loose $sp^2$ carbon. FIG. 16(c) shows interferometry data collected showing pits of approximately 45 micrometres wide and approximately 50 micrometres deep.

Figure 17A:
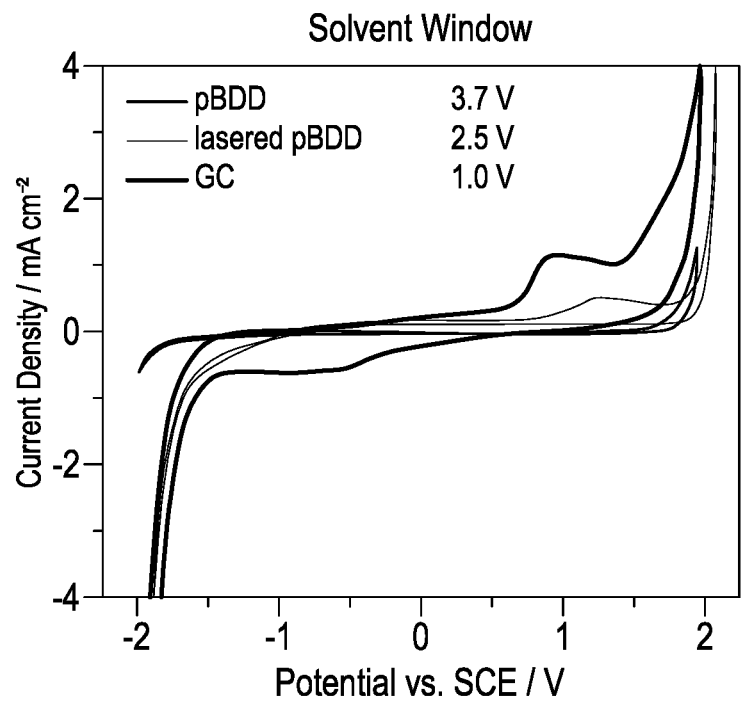
FIGS. 17(a) and 17(b) show the solvent window and capacitance of three different types of electrode: a lasered polycrystalline boron doped diamond electrode; an unlasered polycrystalline boron doped diamond electrode; and a glassy carbon electrode.
Figure 17B:
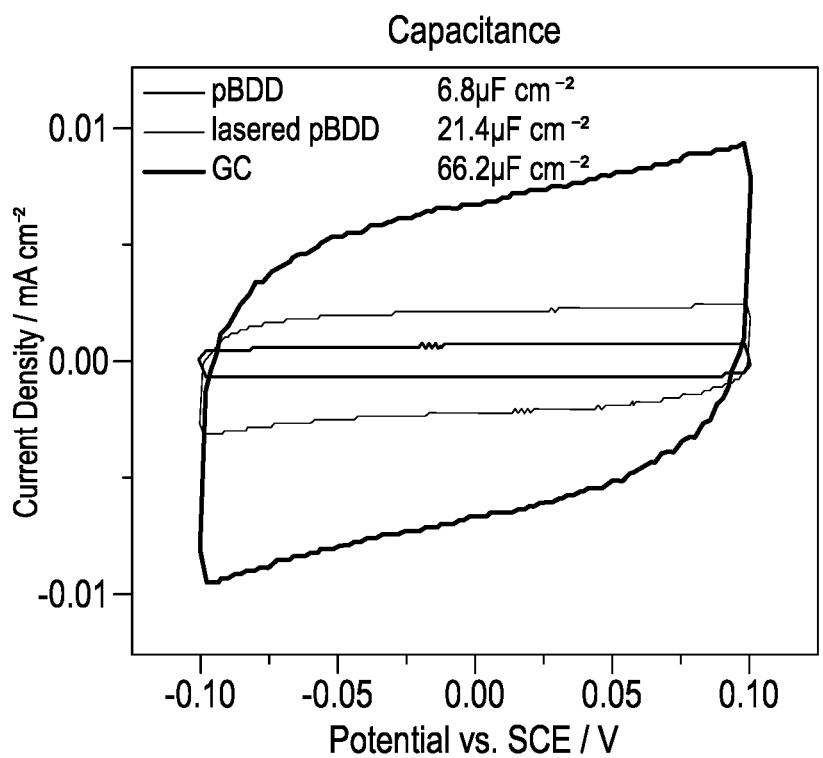

The electrochemistry of the laser patterned polycrystalline boron doped diamond electrodes was then tested versus un-modified polycrystalline boron doped diamond and glassy carbon. FIGS. 17(a) and 17(b) show the solvent window and capacitance of the three different types of electrode (the solvent window range is specified between ±0.4 mA cm$^{-2}$). It can be seen that the laser patterned boron doped diamond electrodes have a solvent window and capacitance response which is intermediate between bare boron doped diamond material and glassy carbon. It can be seen that laser patterned polycrystalline boron doped diamond exhibits the benefits of higher catalytic activity associated with glassy carbon, along with the advantageous lower background currents attributed to boron doped diamond.

Figure 18A:
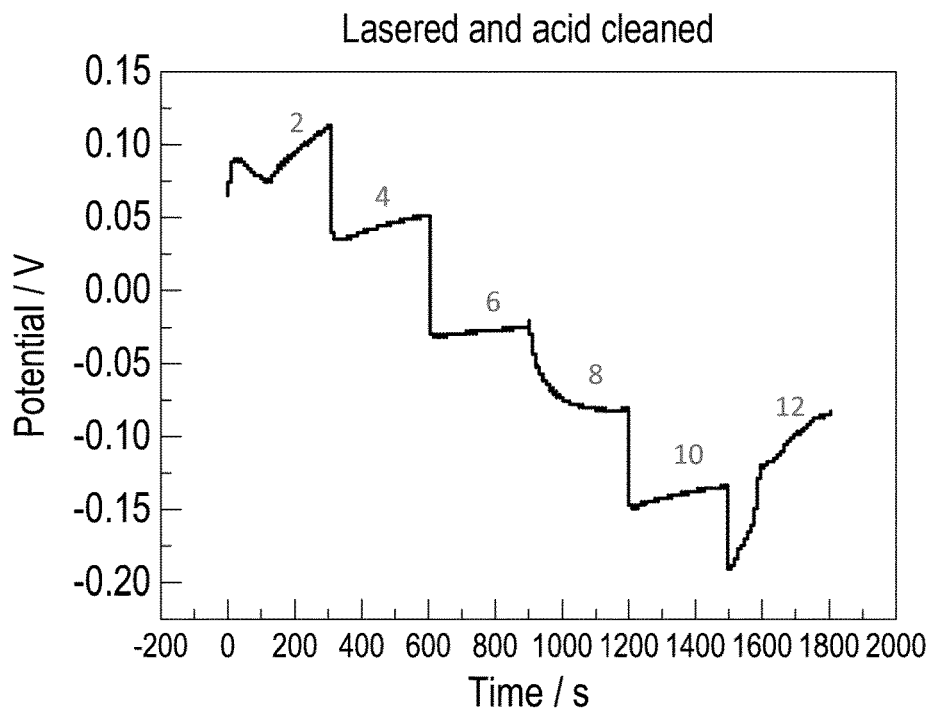
FIG. 18(a) shows the OCP response for a lasered and acid cleaned electrode.
Figure 18B:
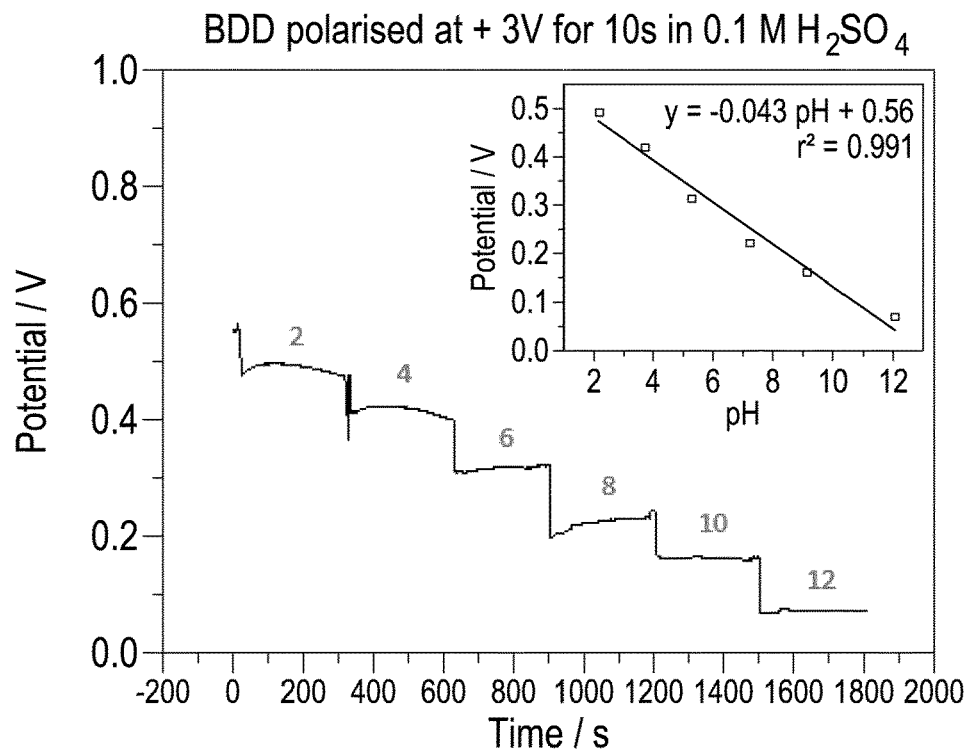
FIG. 18(b) shows the OCP response after the electrode was polarised at +3 V for 10 s in 0.1 M $H_2SO_4$.

The open circuit potential of the laser patterned boron doped diamond electrode was then investigated. FIG. 18(a) shows the OCP response for a laser ablated and acid cleaned electrode whereas FIG. 18(b) shows the OCP response after the electrode was polarised at +3 V for 10 s in 0.1 M $H_2SO_4$. A more linear response is obtained when compared to bare boron doped diamond material. However, issues still exist in that the OCP response takes a long time to stabilized and the electrodes are still not achieving a Nernstian response although polarisation does lead to an improvement (only a 43 mV gradient is achieved for OCP vs pH as illustrated in the inset of FIG. 18(b)). It has been postulated that there may be insufficient C=O groups on the electrode surface to achieve the desired Nernstian response.

Figure 19:
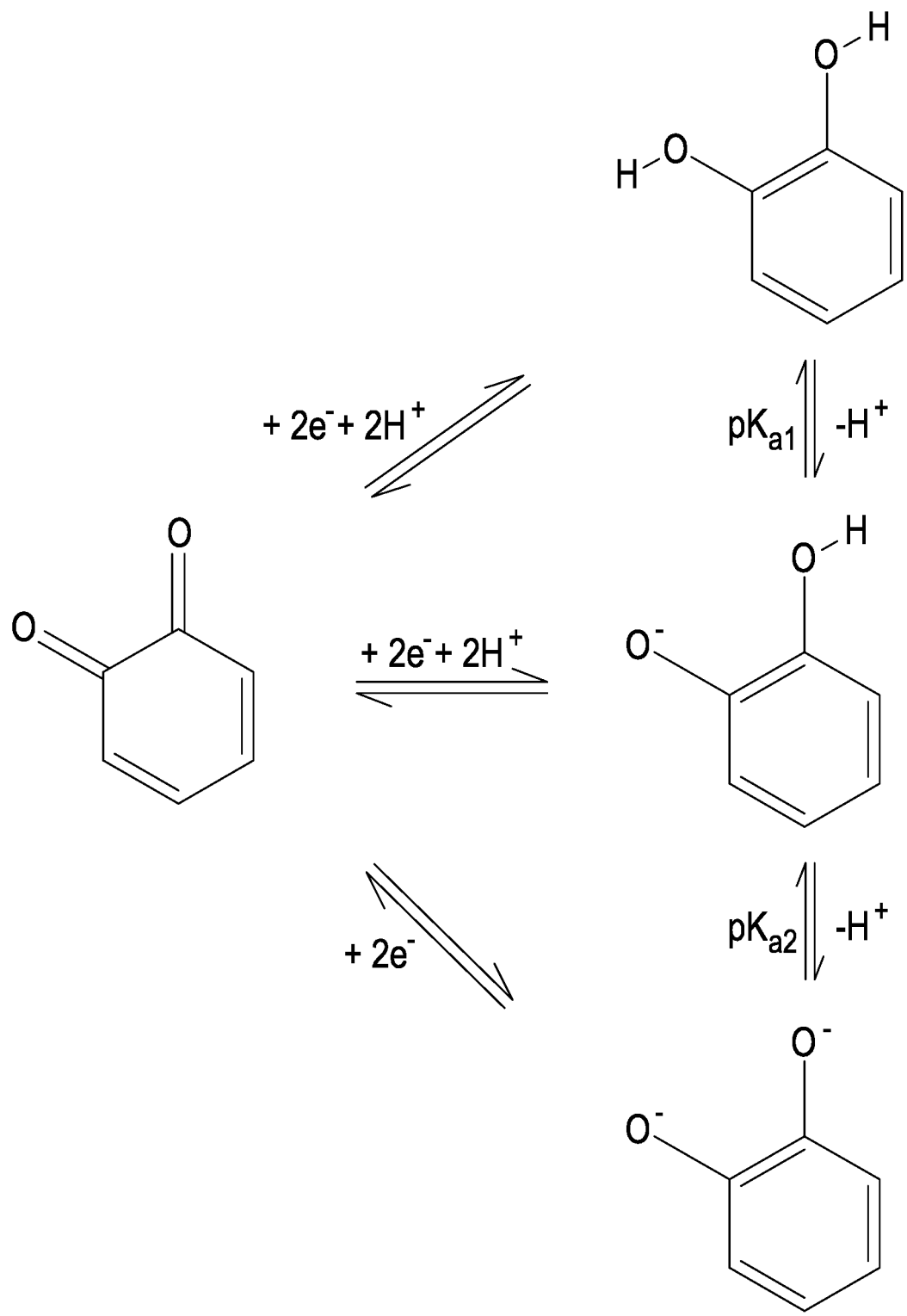
FIG. 19 illustrates pH sensitive electron transfer characteristics of quinones.
Figure 20A:
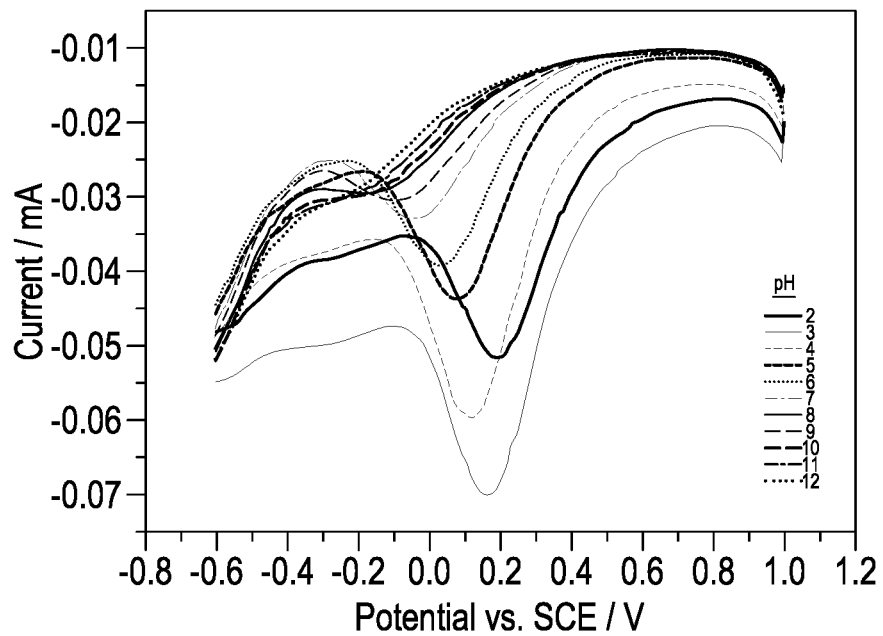
FIGS. 20(a) and 20(b) show the results of performing square wave voltammetry in different pH solutions on a bare glassy carbon electrode illustrating a Nernstian pH response for the quinone reduction peak.
Figure 20B:
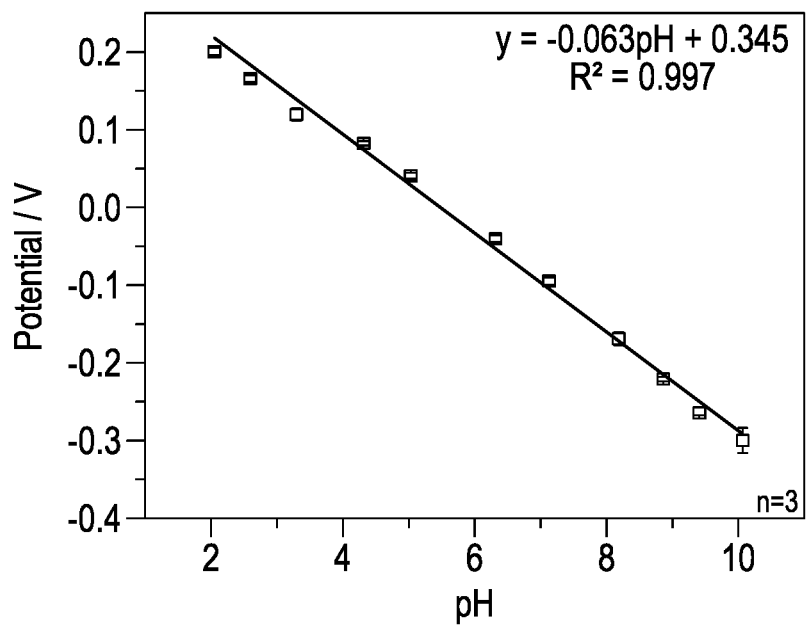

In light of the failure to achieve a satisfactory method of measuring pH using an open circuit potential route with boron doped diamond electrodes even when laser patterned to introduce sp2 carbon, other electrochemical methods of pH detection have been considered. In this regard, as previously indicated, quinones are present on $sp^2$ surfaces, the electron transfer characteristics of which are [H$^+$] dependent as illustrated in FIG. 19. It has been shown that the reduction potential of quinone on the surface of a glassy carbon electrode is pH dependent and that this case be used to measure pH. FIGS. 20(a) and 20(b) show the results of performing square wave voltammetry in different pH solutions on a bare glassy carbon electrode illustrating a Nernstian pH response (59 mV) for the quinone reduction peak. The present inventors have thus considered that if similar functionalization could be applied to a boron doped diamond electrode then this could provide a route to a diamond based pH sensor.

Figure 21:
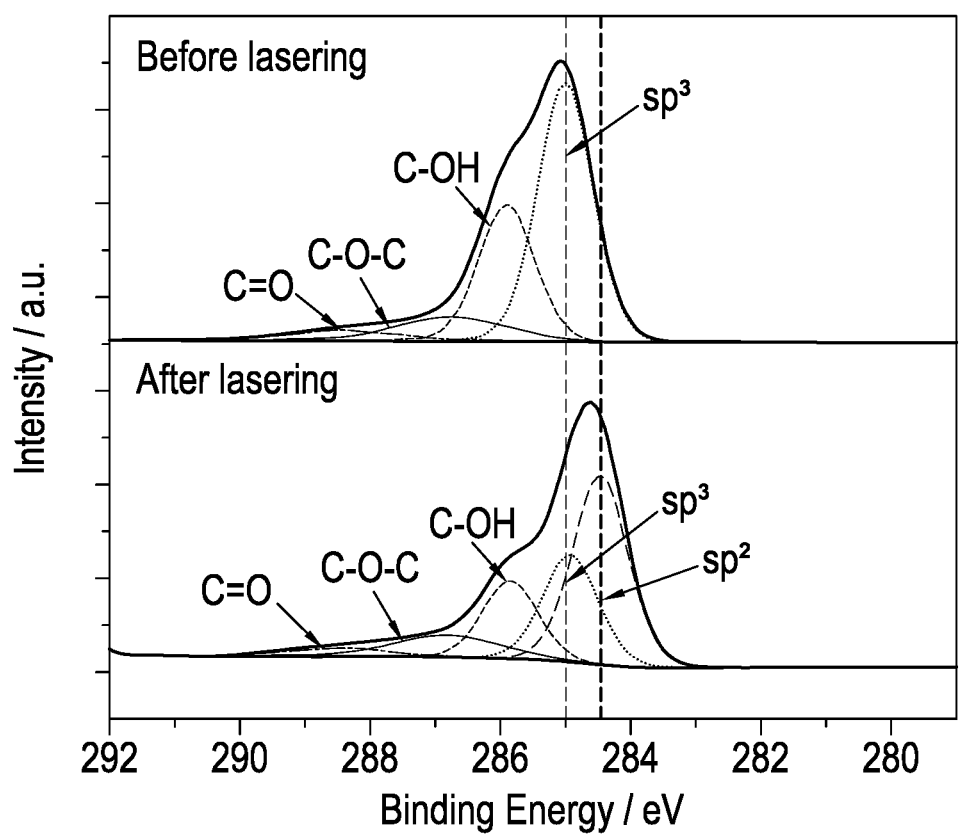
FIG. 21 shows the results of performing x-ray photoelectron spectroscopy to analyse the top 3 nm of polycrystalline boron doped diamond material before and after laser patterning indicating the emergence of an sp2 peak after lasering.
Figure 22:
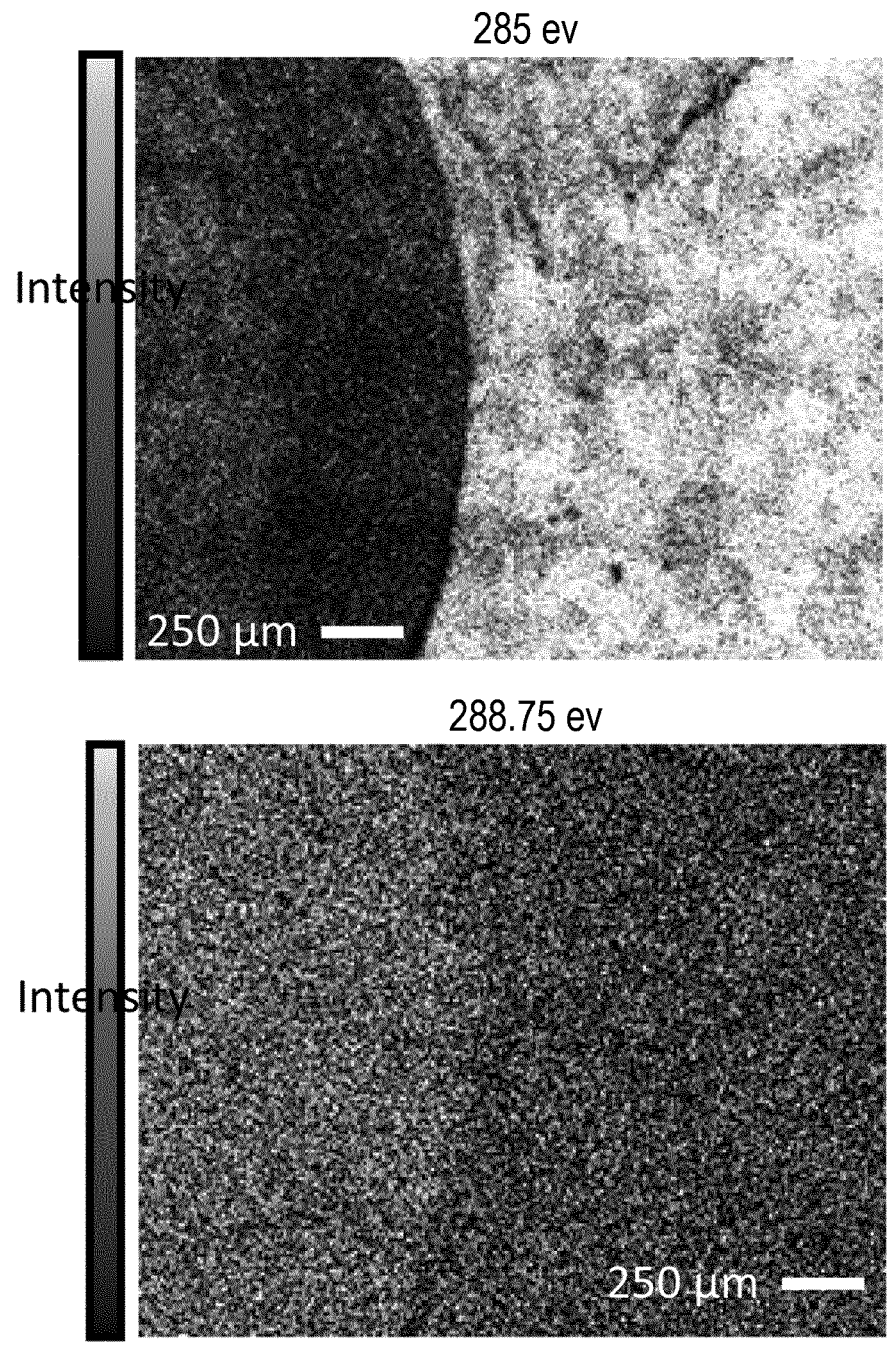
FIG. 22 shows high resolution x-ray photoelectron spectroscopic imaging for C═O groups on a laser patterned boron doped diamond electrode with a data point resolution of 3 micrometres shows that C═O groups are more prevalent in laser pits and thus there is a highly likelihood for more quinone groups.
Figure 23:
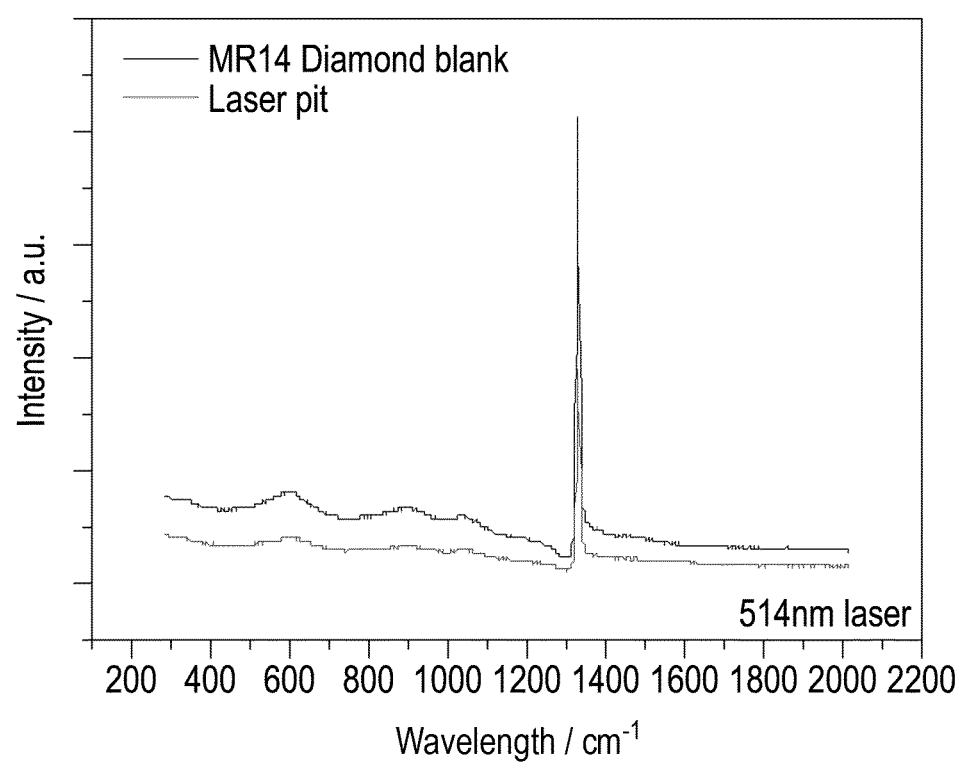
FIG. 23 shows a Raman spectra analysis of the laser pits compared with the unlasered boron doped diamond material indicating no obvious increase in sp2 and thus indicating that the bulk of the electrode remains as sp3 diamond even in the laser patterned regions.

Following the above, x-ray photoelectron spectroscopy has been performed to analyse the top 3 nm of polycrystalline boron doped diamond material before and after laser patterning along the lines previously described. FIG. 21 shows the results indicating the emergence of an sp2 peak after laser patterning. High resolution XPS imaging for C=O groups on a laser patterned boron doped diamond electrode with a data point resolution of 3 micrometres shows that C=O groups are more prevalent in laser pits and thus there is a highly likelihood for more quinone groups (see FIG. 22). However, a Raman spectra analysis of the laser pits compared with the un-modified boron doped diamond material indicates no obvious increase in sp2 (G peak) as illustrated in FIG. 23. This can be understood as Raman is a bulk measurement with a penetration depth of several 100 nanometres and indicates that even though pits have been laser ablated containing amorphous carbon, the bulk of the electrode is still sp3 diamond. This also illustrates why the lasered boron doped diamond has electrochemical characteristics which are intermediate between glassy carbon and bare boron doped diamond.

Figure 24A:
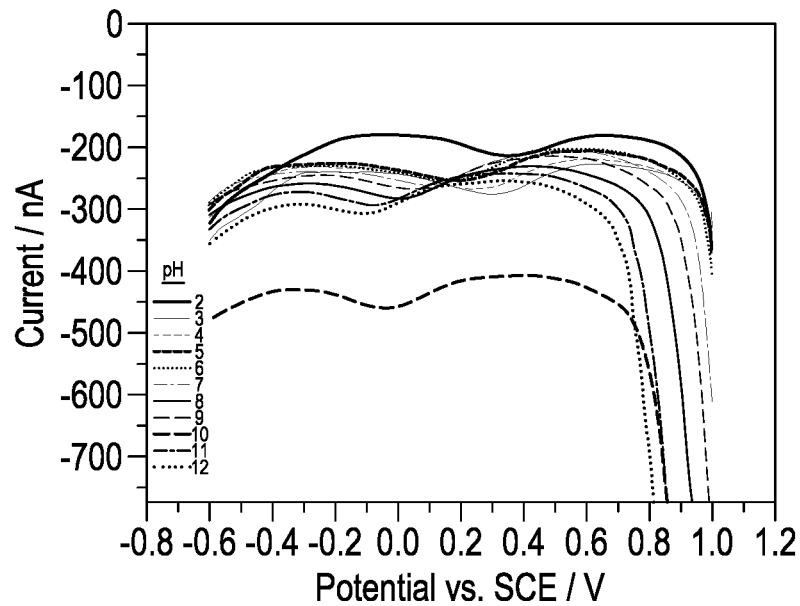
FIG. 24 shows the results of square wave voltammetry of quinone reduction on a laser patterned polycrystalline boron doped diamond surface indicate a deviation from a Nernstian response for acidic pH solutions.
Figure 24B:
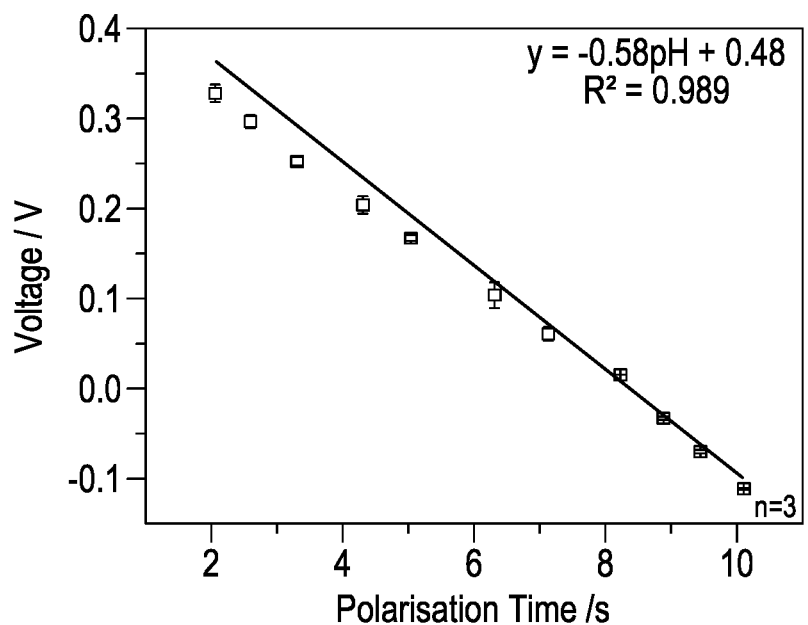
Figure 25A:
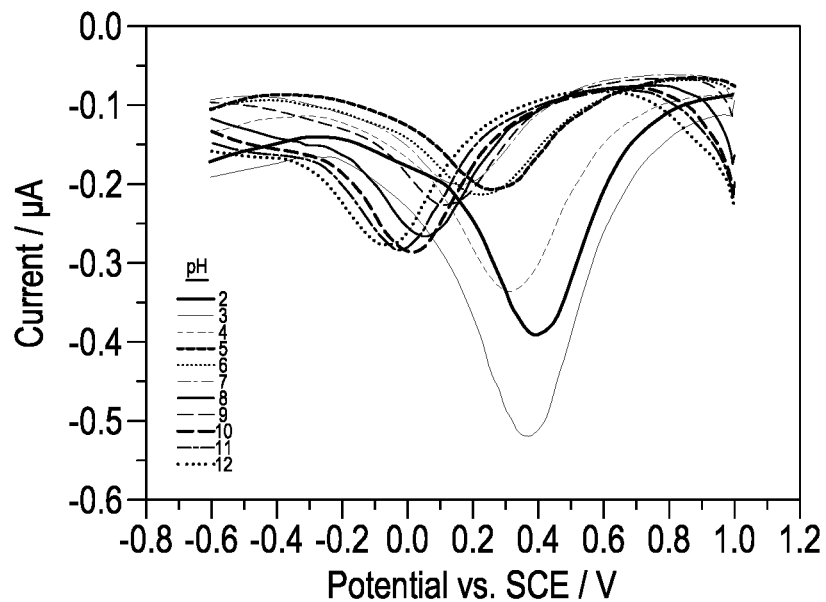
FIG. 25 shows the results of square wave voltammetry of quinone reduction on a laser patterned and anodically polarized polycrystalline boron doped diamond surface indicating a Nernstian pH response across at least a pH range of 2 to 10.
Figure 25B:
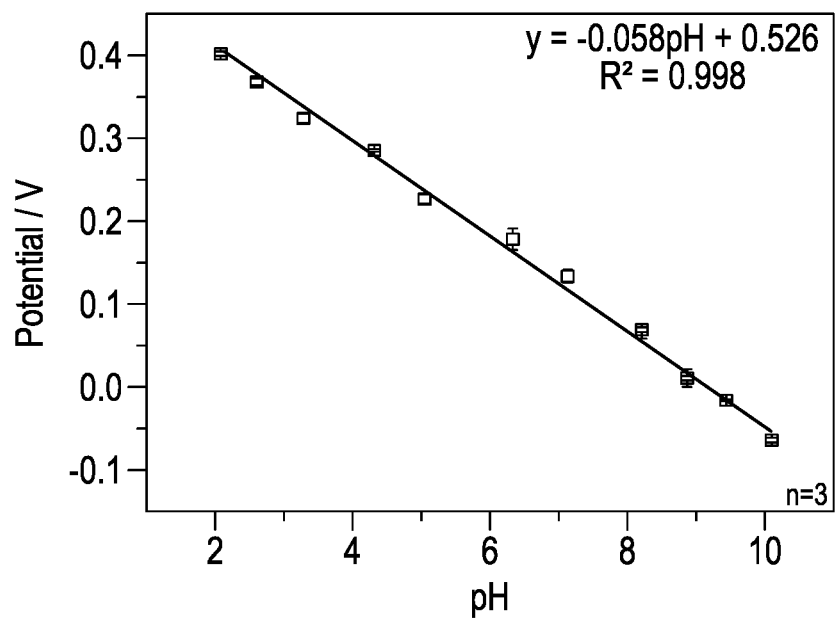

Quinone reduction was then investigated on a polycrystalline boron doped diamond surface. The results of square wave voltammetry of quinone reduction on a polycrystalline boron doped diamond surface are illustrated in FIG. 24. The results indicate that while a Nernstian pH response at alkaline pH was observed, there is a deviation from the Nernstian response for acidic pH solutions. This implies that not enough quinones are present on functionalized boron doped diamond surface for pH sensing. The laser patterned polycrystalline boron doped diamond electrodes were then anodically polarized at 7 mA (approximately +3 V) for 60 seconds. The quinone reduction measurements at different pH were then re-measured. The results of square wave voltammetry of quinone reduction on an acid treated and anodically polarized polycrystalline boron doped diamond surface are illustrated in FIGS. 25(a) and 25(b). A Nernstian pH response (about 59 mV) is observed across at least a pH range of 2 to 10.

Figure 26:
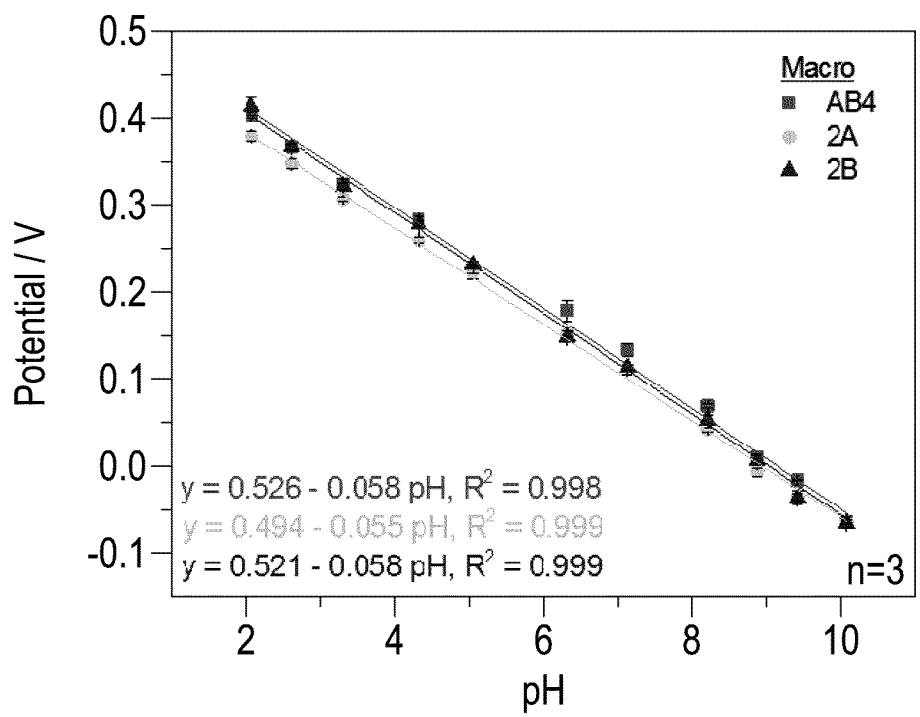
FIG. 26 shows results for a number of polycrystalline boron doped diamond macroelectrodes of 1 mm diameter, laser patterned and anodically polarised at 7 mA for 60 s in 0.1 M sulphuric acid indicating repeatability with all electrodes showing a similar pH response.

The repeatability of the above described results has been tested by preparing a number of polycrystalline boron doped diamond macroelectrodes of 1 mm diameter, laser patterning the electrodes, and polarising the electrodes at 7 mA for 60 s in 0.1 M sulphuric acid. pH measurements were then performed for all the electrodes and the results are illustrated in FIG. 26. As can be seen from FIG. 26, all the electrodes show a similar pH response indicating good repeatability.

Figure 27:
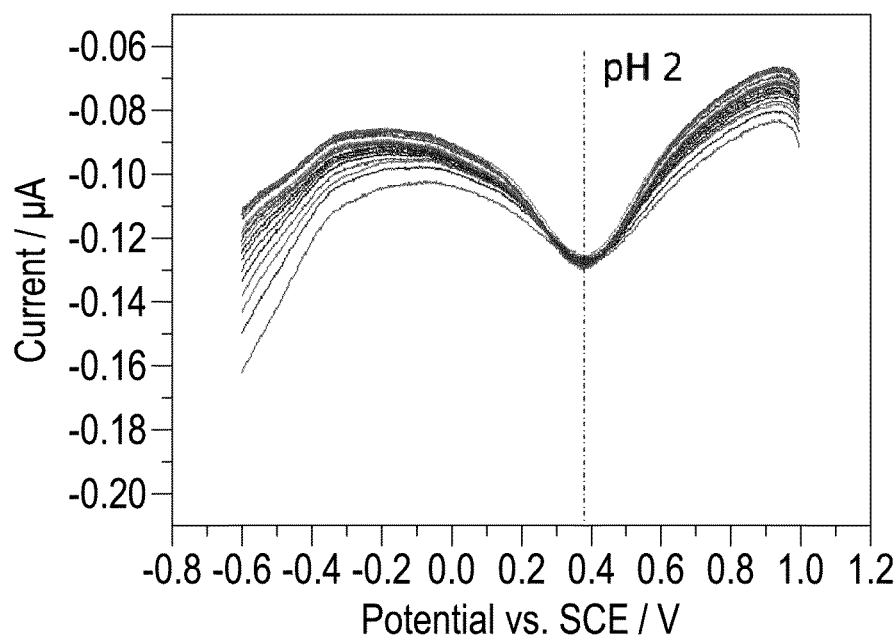
FIG. 27 shows a pH measurement at pH 2 for twenty repeat measurements on a single electrode illustrating that once polarised the diamond based pH sensing electrode is stable.
Figure 28A:
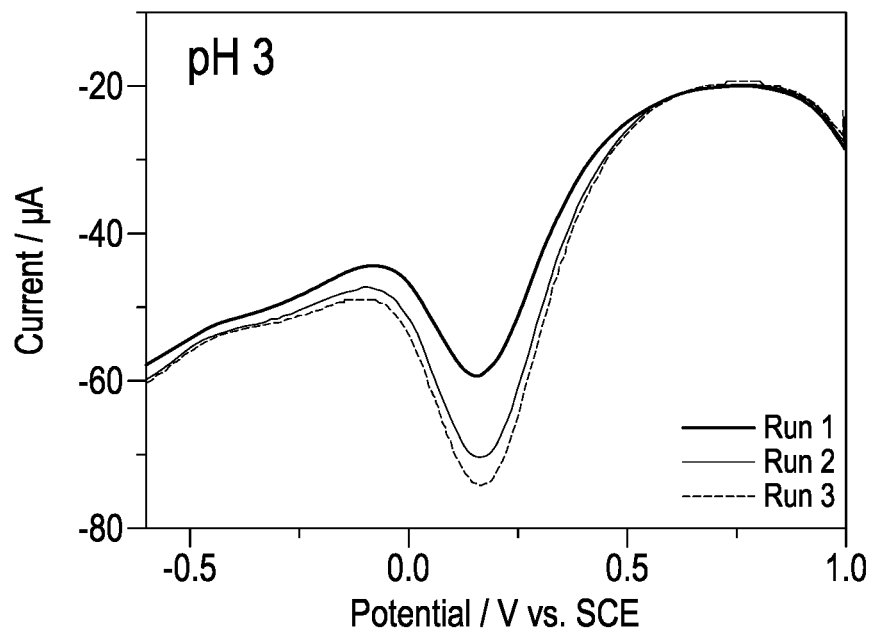
FIG. 28 shows the pH response in the presence of dissolved lead ($Pb^2$) for a glassy carbon electrode (FIGS. 28(a), 28(c), 28(e)) and a diamond based electrode (FIGS. 28(b), 28(d), 28(f)) at pH values of 3, 7, and 11 indicating that signal to noise and peak stability is much improved in this environment for a diamond based electrode compared with a glassy carbon electrode.
Figure 28B:
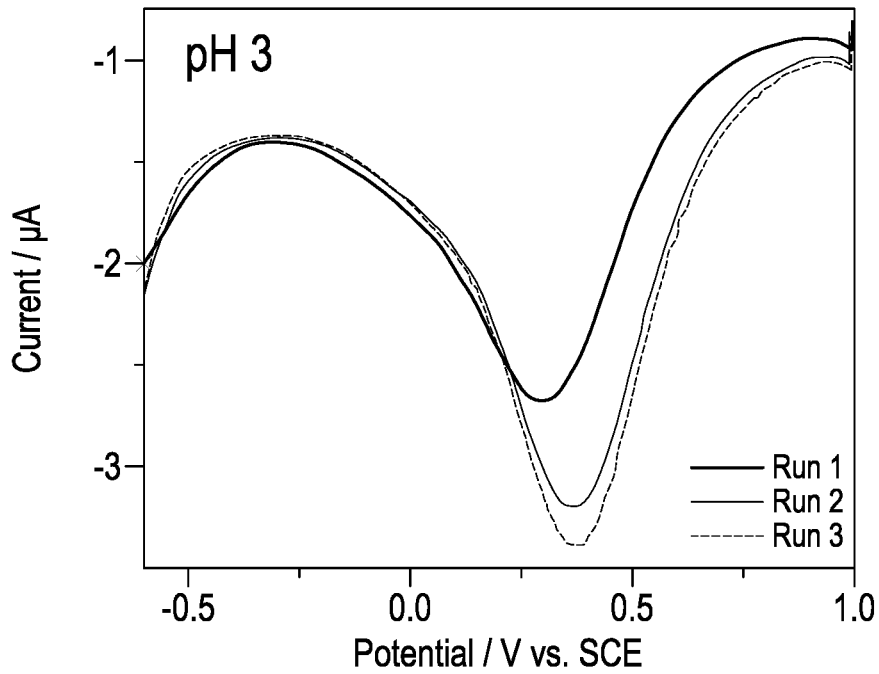
Figure 28C:
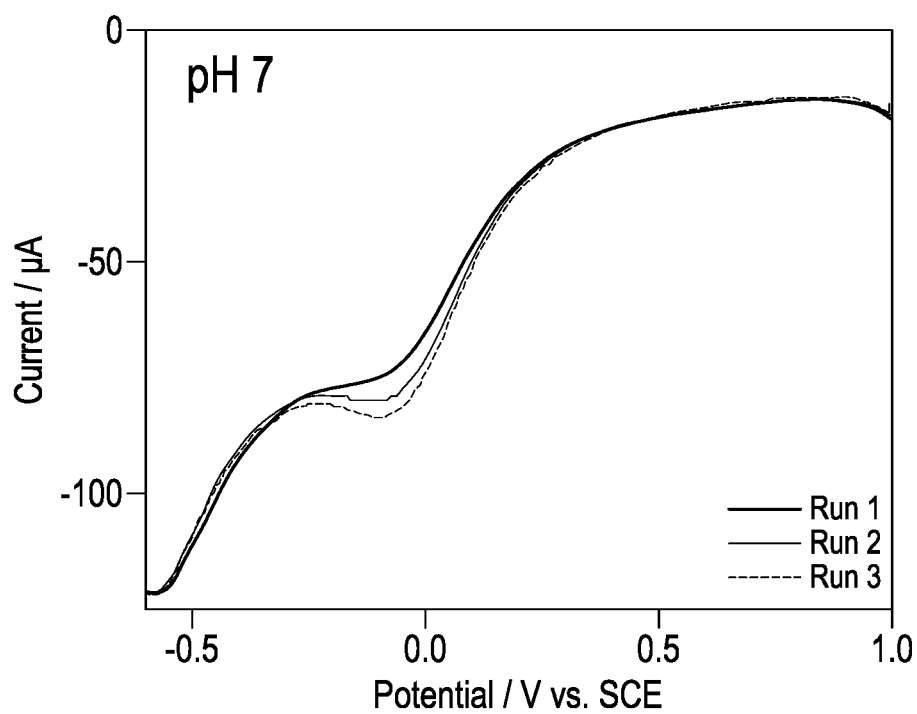
Figure 28D:
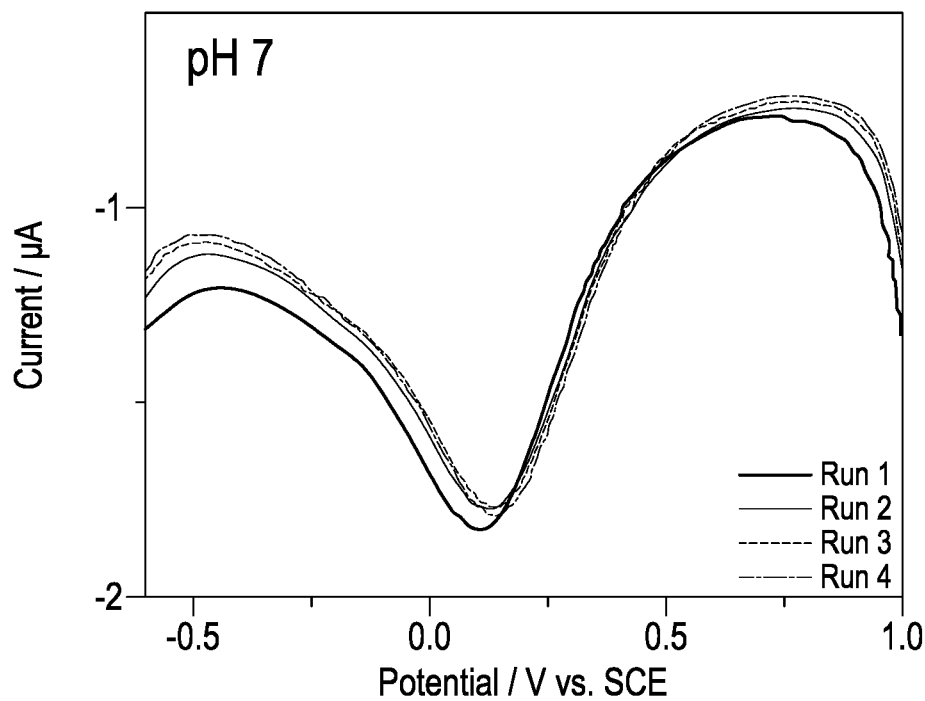
Figure 28E:
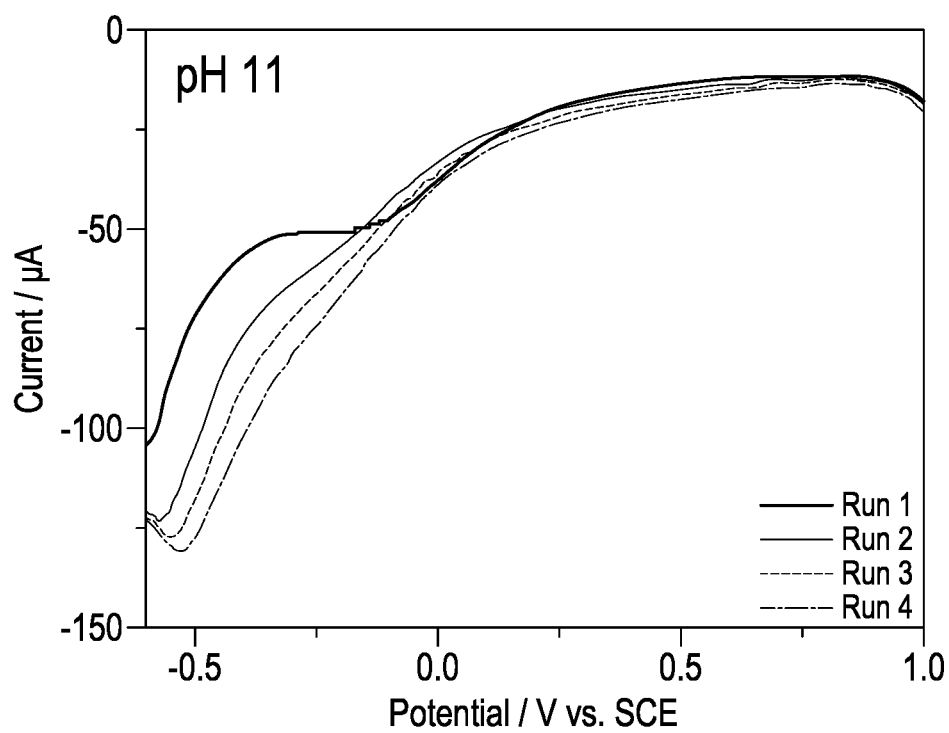
Figure 28F:
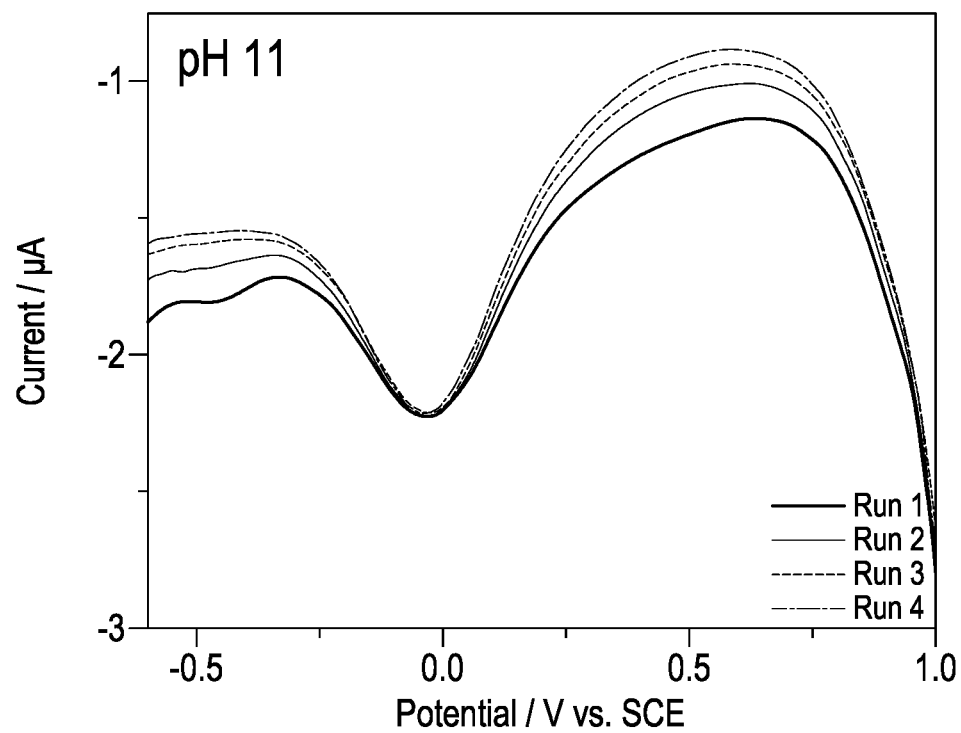

As previously described, the present diamond based pH sensor approach effectively combines the advantageous properties of glassy carbon electrodes in terms of reactivity with those of diamond electrodes in terms of inertness, and achieves an electrode which is sufficiently active to perform pH measurements without being too active that interferences in the pH measurement are problematic. For example, in both of the Compton papers (Lu, M., Compton, G. R., Analyst, 2014, 139, 2397 and Lu, M., Compton, G. R., Analyst, 2014, 139, 4599-4605) in order to make accurate measurements using glassy carbon degassing of the solution is required for at least 20 minutes. For the diamond based electrodes as described herein, due to their lower catalytic activity oxygen reduction is not favoured within the region of interest (where quinone reduction occurs). Furthermore, once polarised the diamond based pH sensing electrodes as described herein have a stable response. For example, FIG. 27 shows a pH measurement at pH 2 for twenty repeat measurements illustrating that the response is stable even for a pH value which has a smaller peak than for higher pH readings.

Following the above, the possibility of redox active metal interference has been investigated and compared to glassy carbon electrodes. FIG. 28 shows the pH response in the presence of dissolved lead ($Pb^{2+}$) for a glassy carbon electrode (FIGS. 28(a), 28(c), 28(e)) and a diamond based electrode fabricated in accordance with the present invention (FIGS. 28(b), 28(d), 28(f)) at pH values of 3, 7, and 11. As can be seen from the results, signal to noise and peak stability is much improved in this environment for a diamond based electrode compared with a glassy carbon electrode.

Figure 29A:
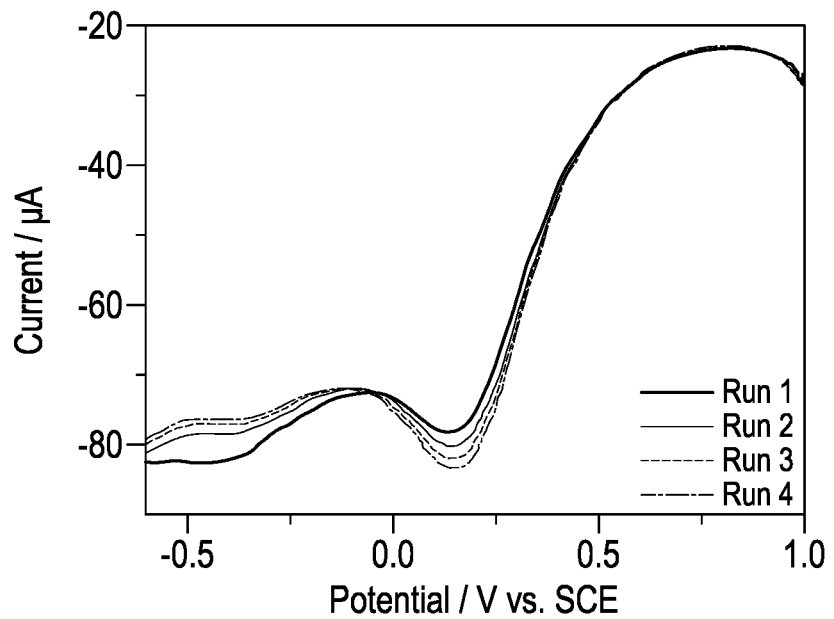
FIG. 29 shows the pH response in the presence of dissolved cadmium ($Cd^2$) for a glassy carbon electrode (FIGS. 29(a), 29(c)) and a diamond based electrode (FIGS. 29(b), 29(d)) at pH values of 3 and 11 indicating that signal to noise and peak stability is also improved in this environment for a diamond based electrode compared with a glassy carbon electrode.
Figure 29B:
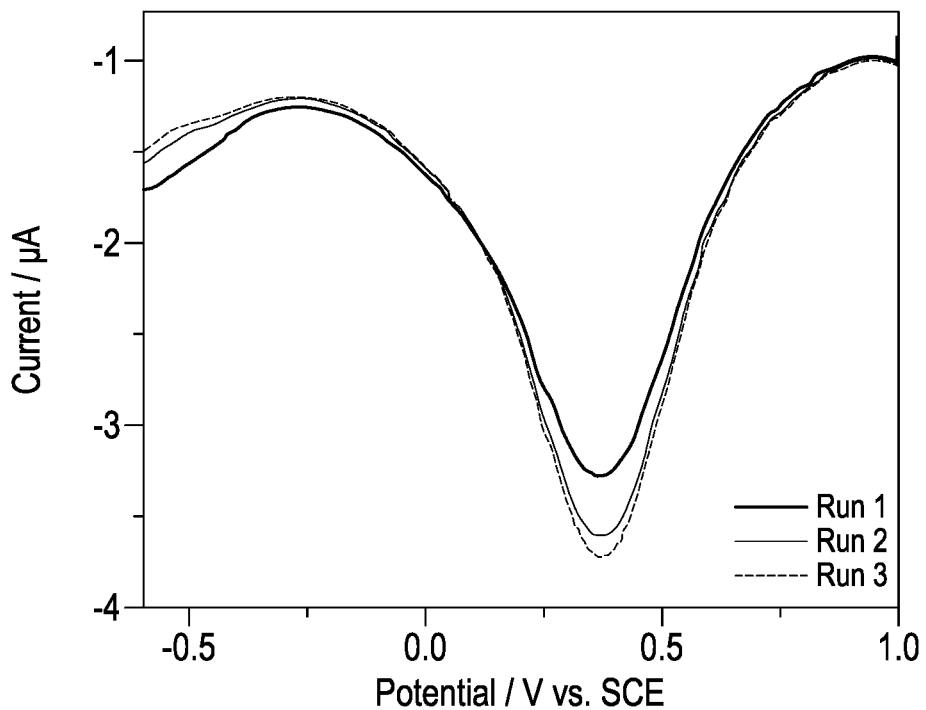
Figure 29C:
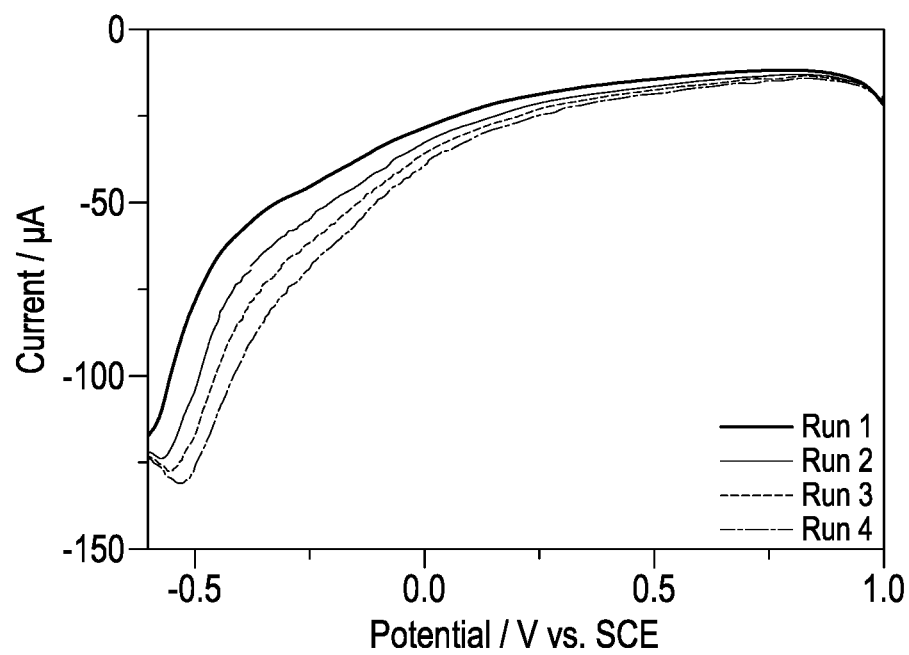
Figure 29D:
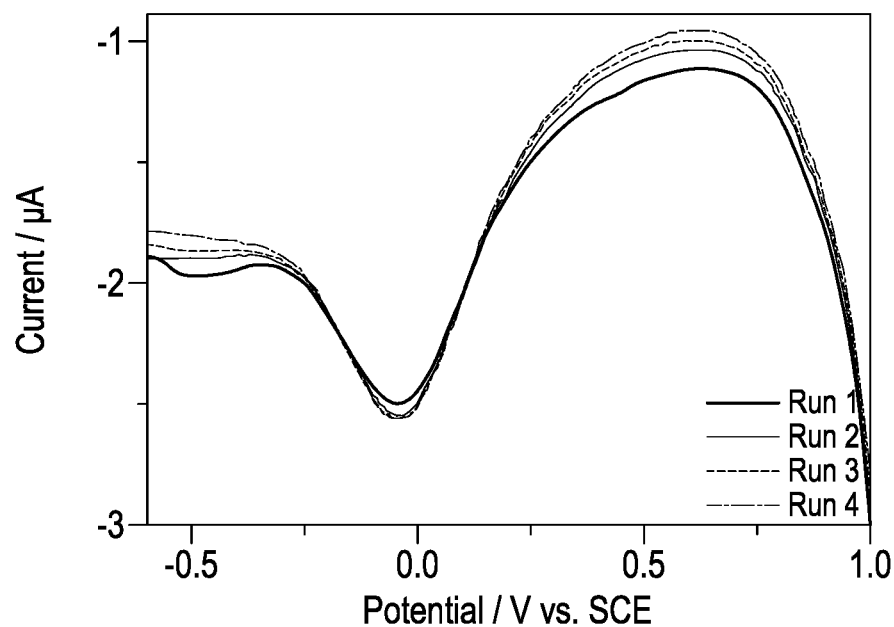

FIG. 29 shows the pH response in the presence of dissolved cadmium ($Cd^{2+}$) for a glassy carbon electrode (FIGS. 29(a), 29(c)) and a diamond based electrode fabricated in accordance with the present invention (FIGS. 29(b), 29(d)) at pH values of 3 and 11. As can be seen from the results, signal to noise and peak stability is also improved in this environment for a diamond based electrode compared with a glassy carbon electrode.

In light of the above, it has been determined that by providing controlled amounts of sp2 carbon at the sensing surface of a boron doped diamond electrode (e.g. by controlled diamond growth or by post-synthesis processing such as by laser patterning) it is possible to increase the catalytic activity of a boron doped diamond electrode while retaining, at least to some degree, the inert properties of the basic boron doped diamond material. This can be used for sensing target species such as chlorine which are not detectable using boron doped diamond material with low sp2 carbon content and so long as not too much sp2 carbon is provided at the sensing surface then a low background signal can be retained. In addition, by treating such a diamond electrode (e.g. by anodically polarizing the electrode) to provide a particular type of surface termination, and particular providing carbonyl containing groups such as quinone, it is also possible to provide further sensing capability such as pH sensing. In this case the sensor can be calibrated to give a pH reading based on the potential of a redox peak of the carbonyl containing surface species which shifts in a reproducible manner according to the pH of the solution in which the diamond electrode is placed.

While this invention has been particularly shown and described with reference to embodiments, it will be understood to those skilled in the art that various changes in form and detail may be made without departing from the scope of the invention as defined by the appending claims.

The invention claimed is:

1. An electrochemical sensor comprising:
    a boron doped diamond electrode formed of boron doped diamond material;
    a patterned array of non-diamond carbon sites disposed on a sensing surface of the boron doped diamond electrode, wherein a size and distribution of the non-diamond carbon sites on the sensing surface of the boron doped diamond electrode is such that a diamond electrochemical sensor head provides a signal to background ratio for current density of a target species in a solution of at least 2.5, and/or a background current density at a peak current density for the target species of no less than −10 mA/cm$^2$ and no more than 10 mA/cm$^2$, wherein the non-diamond carbon sites comprise sp2 hybridized carbon;
    electrochemically active surface groups bonded to the non-diamond carbon sites for generating a redox peak associated with the target species which reacts with the electrochemically active surface groups bonded to the non-diamond carbon sites when the solution containing the target species is disposed in contact with the sensing surface in use;
    an electrical controller configured to scan the boron doped diamond electrode over a potential range to generate said redox peak; and
    a processor configured to give an electrochemical reading based on one or both of a position and an intensity of said redox peak.

2. An electrochemical sensor according to claim 1, wherein the electrochemically active surface groups are carbonyl containing groups.

3. An electrochemical sensor according to claim 2, wherein the carbonyl containing groups are quinone groups.

4. An electrochemical sensor according to claim 1, wherein the patterned array of non-diamond carbon sites disposed on the sensing surface of the boron doped diamond electrode is intrinsic non-diamond carbon.

5. An electrochemical sensor according to claim 1, wherein the boron doped diamond electrode is disposed in an electrically insulating diamond support matrix.

6. An electrochemical sensor according to claim 1, wherein the patterned array of non-diamond carbon sites comprises a plurality of isolated non-diamond carbon sites, each having a size in a range of 10 nm to 100 micrometres.

7. A method for determining a pH of a composition, said method comprising:
   providing the composition, and
   measuring the pH of said composition with the electrochemical sensor of claim 1.

8. A method for measuring a chlorine concentration of a composition, said method comprising:
   providing the composition, and
   measuring the chlorine concentration of said composition with the electrochemical sensor of claim 1.

* * * * *